(12) United States Patent
Ryu et al.

(10) Patent No.: US 11,997,684 B2
(45) Date of Patent: May 28, 2024

(54) METHOD AND DEVICE FOR TRANSMITTING AND RECEIVING UPLINK CONTROL INFORMATION IN WIRELESS COMMUNICATION SYSTEM

(71) Applicant: Samsung Electronics Co., Ltd., Suwon-si (KR)

(72) Inventors: Hyunseok Ryu, Yongin-si (KR); Hyunkyu Yu, Suwon-si (KR); Jaewon Kim, Seoul (KR); Hyukmin Son, Hanam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/971,884

(22) Filed: Oct. 24, 2022

(65) Prior Publication Data
US 2023/0067701 A1    Mar. 2, 2023

Related U.S. Application Data

(63) Continuation of application No. 16/325,630, filed as application No. PCT/KR2017/008980 on Aug. 17, 2017, now Pat. No. 11,483,805.
(Continued)

(51) Int. Cl.
*H04W 72/21*    (2023.01)
*H04W 72/51*    (2023.01)

(52) U.S. Cl.
CPC ............ *H04W 72/21* (2023.01); *H04W 72/51* (2023.01)

(58) Field of Classification Search
None
See application file for complete search history.

(56) References Cited

U.S. PATENT DOCUMENTS

| 9,729,295 B2* | 8/2017 | Zhang ................... H04L 1/1861 |
| 2009/0197590 A1 | 8/2009 | Borran et al. |

(Continued)

FOREIGN PATENT DOCUMENTS

| KR | 10-2014-0108393 A | 9/2014 |
| WO | 2017/172535 A1 | 10/2017 |

OTHER PUBLICATIONS

Qualcomm Incorprated, 'Collision handling', R1-164446, 3GPP TSG RAN WG1 Meeting #85, Nanjing, China, May 14, 2016.
(Continued)

*Primary Examiner* — Alex Skripnikov
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides a method by which a terminal, during uplink signal transmission: receives, from a base station, first information for indicating transmission of uplink control information and/or data in a specific subframe; receives, from the base station, second information for indicating transmission of the uplink control information and/or the data in the specific subframe; and determines the uplink control information and/or the data to be transmitted in the specific subframe on the basis of a capability of the terminal and transmits the determined uplink control information and/or data in the specific subframe.

20 Claims, 31 Drawing Sheets

Related U.S. Application Data

(60) Provisional application No. 62/376,532, filed on Aug. 18, 2016.

(56) References Cited

U.S. PATENT DOCUMENTS

| | | |
|---|---|---|
| 2010/0271970 A1 | 10/2010 | Pan et al. |
| 2011/0141928 A1 | 6/2011 | Shin et al. |
| 2011/0141941 A1* | 6/2011 | Lee ................... H04L 5/0053 370/252 |
| 2013/0230030 A1 | 9/2013 | Papasakellariou et al. |
| 2013/0343322 A1 | 12/2013 | Lee et al. |
| 2014/0198737 A1 | 7/2014 | Papasakellariou |
| 2014/0241220 A1 | 8/2014 | Choi et al. |
| 2014/0241298 A1 | 8/2014 | Park et al. |
| 2014/0269452 A1 | 9/2014 | Papasakellariou |
| 2015/0139136 A1* | 5/2015 | Zhang ................ H04W 72/23 370/329 |
| 2015/0341923 A1* | 11/2015 | Yang ................... H04W 72/20 370/329 |
| 2016/0007324 A1* | 1/2016 | Lee .................... H04L 1/1671 370/329 |
| 2016/0183308 A1 | 6/2016 | Eriksson et al. |
| 2016/0211950 A1* | 7/2016 | Cheng ................ H04W 72/23 |
| 2016/0218838 A1 | 7/2016 | Cui et al. |
| 2016/0219613 A1 | 7/2016 | Lei |
| 2016/0262182 A1* | 9/2016 | Yang ................... H04L 1/1854 |
| 2016/0295561 A1* | 10/2016 | Papasakellariou .... H04W 72/23 |
| 2016/0302235 A1* | 10/2016 | Hwang ................ H04W 52/50 |
| 2016/0330010 A1* | 11/2016 | Qin .................... H04L 5/0058 |
| 2016/0359663 A1* | 12/2016 | Song ................... H04L 5/003 |
| 2017/0295005 A1* | 10/2017 | Lee .................. H04W 36/0055 |
| 2017/0374658 A1* | 12/2017 | Kim .................... H04L 5/0048 |
| 2018/0123769 A1 | 5/2018 | Pelletier et al. |

OTHER PUBLICATIONS

Korean Office Action dated Jan. 12, 2022, issued in a counterpart Korean Application No. 10-2017-0104275.

Sequans Communications; collision between PUCCH and PUSCH; 3GPP TSG-RAN WG1 #85; R1-164597, May 15, 2016, Nanjing, China.

Ericsson; Multiplexing of UCI and PUSCH for BL/CE UE; 3GPP TSG-RAN1 Meeting #85; R1-165394, May 14, 2016, Nanjing, China.

Korean Notice of Allowability dated Jul. 14, 2022, issued in a counterpart Korean Application No. 10-2017-0104275.

Qualcomm, Sony, Intel, Samsung, Lenovo, InterDigital, Ericsson, Huawei, HiSi; WF on PUSCH / PUCCH collision handling; 3GPP TSG RAN WG1 Meeting #82bis; R1-156237; Aug. 2015, Malmo, Sweden.

* cited by examiner

[310]

(330)

(400)

(410)

(420)

(430)

(500)

(530)

METHOD AND DEVICE FOR TRANSMITTING AND RECEIVING UPLINK CONTROL INFORMATION IN WIRELESS COMMUNICATION SYSTEM

CROSS-REFERENCE TO RELATED APPLICATION(S)

This application is a continuation application of prior application Ser. No. 16/325,630, filed on Feb. 14, 2019, which has issued as U.S. Pat. No. 11,483,805 on Oct. 25, 2022, which is a U.S. National Stage application under 35 U.S.C. § 371 of an International application number of PCT/KR2017/008980, filed on Aug. 17, 2017, which claimed a benefit of U.S. Provisional application Ser. No. 62/376,532, filed on Aug. 18, 2016, in the U.S. Patent and Trademark Office, the disclosure of each of which is incorporated by reference herein in its entirety.

TECHNICAL FIELD

The disclosure relates to a method and a device for transmitting and receiving uplink control information, and more particularly, to a method and a device for transmitting and receiving uplink control information triggered by downlink control information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the 5G communication system that has been actively studied, a dynamic frame structure has been considered to satisfy various requirements, and in this case, transmission of uplink control information is triggered through downlink control information. Accordingly, there is a need for a method and a device for efficiently transmitting the uplink control information.

DISCLOSURE OF INVENTION

Technical Problem

An aspect of the disclosure provides a method for efficiently transmitting and receiving uplink control information in a dynamic frame structure. In particular, an aspect of the disclosure provides an operation method of a terminal in case where collision occurs in transmitting the uplink control information.

Solution to Problem

In accordance with an aspect of the disclosure to solve the above-described problems, a method by a terminal in a communication system includes receiving, from a base station, first information indicating transmission of at least one of uplink control information and data in a specific subframe; receiving, from the base station, second information indicating transmission of at least one of the uplink control information and the data in the specific subframe; determining at least one of the uplink control information and the data to be transmitted in the specific subframe based on a capability of the terminal; and transmitting at least one of the determined uplink control information and the determined data in the specific subframe.

The method further includes determining to transmit, to the base station, both the at least one of the uplink control information and the data indicated by the first information and the at least one of the uplink control information and the data indicated by the second information in the specific subframe based on existence of the terminal capability. The method further includes determining whether the first information and the second information indicate performing of uplink transmission on the same resource and channel based on nonexistence of the terminal capability; and multiplexing the at least one of the uplink control information and the data indicated by the first information and the at least one of the uplink control information and the data indicated by the second information in case where the first information and the second information indicate the same resource and channel. The method further includes determining to transmit, to the base station, the at least one of the uplink control information and the data indicated by the first information or the at least one of the uplink control information and the data indicated by the second information in accordance with a priority of uplink information in case where the first information and the second information do not indicate the same resource and channel. The method further includes transmitting the terminal capability to the base station.

In accordance with another aspect of the disclosure, a method by a base station in a communication system includes transmitting, to a terminal, first information indicating transmission of at least one of uplink control information and data in a specific subframe; transmitting, to the terminal, second information indicating transmission of at least one of the uplink control information and the data in the specific subframe; and receiving at least one of the uplink control information and the data indicated by at least one of the first information and the second information determined based on a capability of the terminal.

In accordance with still another aspect of the disclosure, a terminal in a communication system includes a transceiver configured to transmit and receive signals; and a controller configured to control to receive, from a base station, first information indicating transmission of at least one of uplink control information and data in a specific subframe, receive, from the base station, second information indicating transmission of at least one of the uplink control information and the data in the specific subframe, determine at least one of the uplink control information and the data to be transmitted in the specific subframe based on a capability of the terminal, and transmit at least one of the determined uplink control information and the determined data in the specific subframe.

In accordance with yet still another aspect of the disclosure, a base station in a communication system includes a transceiver configured to transmit and receive signals; and a controller configured to control to transmit, to a terminal, first information indicating transmission of at least one of uplink control information and data in a specific subframe, transmit, to the terminal, second information indicating transmission of at least one of the uplink control information and the data in the specific subframe, and receive at least one of the uplink control information and the data indicated by at least one of the first information and the second information determined based on a capability of the terminal.

Advantageous Effects of Invention

According to the aspects of the disclosure, the terminal and the base station can efficiently trigger the uplink control signal, and can transmit and receive the uplink control information, and through this, the signal transmission efficiency between the terminal and the base station can be heightened.

MODE FOR THE INVENTION

Figure 1:
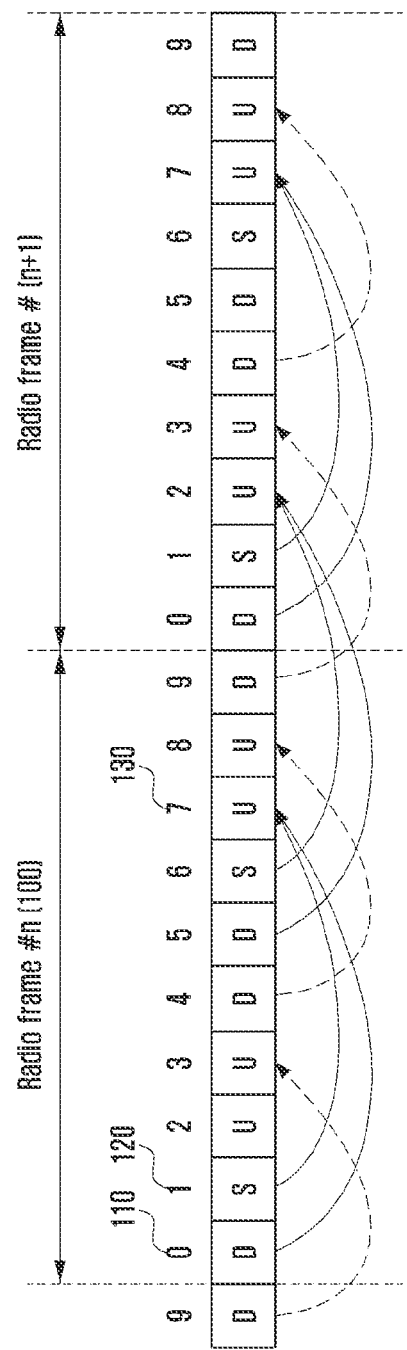
FIG. 1 is a diagram illustrating a timeline of an HARQ-ACK/NACK feedback.

Hereinafter, embodiments of the disclosure will be described in detail with reference to the accompanying drawings.

In explaining the embodiments, explanation of technical contents which are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "~units" may be combined into fewer components and "~units" or further separated into additional components and "~units". Further, the components and "~units" may be implemented to operate one or more CPUs in a device or a security multimedia card. Further, the "~units" in an embodiment may include one or more processors.

At present, efforts have been made to develop an improved 5G communication system since deployment of 4$^{th}$ generation (4G) communication systems. Primary features of the 5G communication system as compared with the 4G communication system are high data rate achievement, low communication latency, and massive connection support. To meet such requirements of the 5G communication system, introduction of a dynamic frame structure has been considered. In contrast with the existing LTE system that is a 4G communication system having a predetermined frame structure, the dynamic frame structure dynamically controls the frame structure through downlink control information (DCI) on a physical downlink control channel (PDCCH) transmitted for each subframe.

The disclosure provides a method and a device for a terminal operation to transmit control information to an uplink in a 5G communication system using such a dynamic frame structure.

In the LTE system in the related art, as control information that a terminal transmits to a base station through an uplink, there are hybrid ARQ (HARQ) positive-acknowledgement (ACK)/negative-acknowledgement (NACK), channel quality indicator (CQI) information, precoding matrix indicator (PMI) information, rank indicator (RI) information, and scheduling request (SR) information. Such control information may be transmitted on a physical uplink control channel (PUCCH) that is an uplink control channel, or may be multiplexed and transmitted with data on a physical uplink shared channel (PUSCH) that is an uplink data channel. Further, in case of aperiodic channel state information (CSI) reporting, the terminal may transmit the HARQ ACK/NACK information and the RI information along with the CQI information and the PMI information to the base station on the PUSCH even if the terminal has no data to be transmitted.

In the related art, downlink control information that the terminal receives from the base station and uplink control information that the terminal transmits to the base station are transmitted by a determined timeline rule. As an example of an HARQ-ACK/NACK feedback, the base station transmits downlink control information and data to the terminal in the n-th subframe, and the terminal transmits corresponding ACK/NACK information to the base station through an uplink in the (n+4)-th subframe. If the base station receives the NACK in the (n+4)-th subframe, the base station retransmits the data to the terminal in the (n+K)-th subframe. In case of a frequency division duplex (FDD) system, the value K is fixed to 8, whereas in case of a time division duplex (TDD) system, the value K may differ depending on the configuration of downlink/uplink (DL/UL) subframe, and if a specific configuration is applied, the value K is fixed.

FIG. 1 is a diagram illustrating a timeline of an HARQ ACK/NACK feedback. Specifically, FIG. 1 illustrates a case where DL/UL configuration #1 is used in a TDD system. The terminal transmits HARQ ACK/NACK information for data transmitted in downlink subframe #0 110 and special subframe #1 120 in accordance with a predetermined timeline in uplink subframe #7 130 included in the n-th radio frame 100.

Since such an operation may be unable to satisfy the low communication latency that is one of the requirements of the 5G communication system, and may limit the degree of freedom of a base station scheduler, flexibility of the base station scheduler may be deteriorated.

A dynamic frame structure has been proposed to maximize flexibility of the base station operation and to satisfy the low communication latency that is one of the requirements of the 5G communication system. In such a dynamic frame structure, the subframe configuration may be dynamically changed for each subframe. For example, the n-th subframe, the (n+1)-th subframe, the (n+2)-th subframe, and the (n+3)-th subframe may be used for downlink data reception, uplink data transmission, downlink data reception, and uplink control information transmission, respectively. Further, an uplink data channel or an uplink control channel, on which the uplink control information can be transmitted, may be dynamically changed for each subframe.

More specifically, in the related art, the following uplink control information has been considered.

CQI: Feedback of downlink channel quality information measured by a terminal

PMI: Feedback of downlink precoding matrix information measured by a terminal

RI: Feedback of downlink rank information measured by a terminal

Channel state information (CSI): Feedback including all of CQI, PMI, and RI information measured by a terminal Beam state information (BSI): The BSI may be composed of a downlink beam index (BI) measured by a terminal and downlink beam quality information (BQI) measured by the terminal. The base station may periodically transmit a beam measurement reference signal (BRS) in order to acquire the beam information BI and BQI from the terminal. The terminal can measure the BRS transmitted by the base station, and can feed the BQI and the BI of the beam having the best quality back to the base station. In this case, the BQI is measured using the BRS, and the BQI may be defined as a BRS received power (BRSRP) of a desired beam or a ratio of the BRS received power of the desired beam to the BRS received power of an interference beam.

On the other hand, the terminal may measure the BRSs transmitted by the base station, align the measured BRSs in the order of their size, and give feedback on N BIs and BQIs corresponding to each BI (e.g., N=1, 2, and so on). The base station may apply such information on N to all terminals in a cell serviced by the base station itself through system information in accordance with the base station command. The base station can apply such information about N to all terminals in the cell being serviced by the base station through system information. As another example of signaling of the information on N, the base station may get feedback of different pieces of beam information by terminals (UEs) through UE-specific RRC signaling or DCI of the downlink control channel. For example, UE-A may give feedback of one best beam to the base station, and UE-B may give feedback of two best beams to the base station.

Beam refinement information (BRI): If the base station operates too many beams, it may take a long time for the terminal to acquire beam information. In this case, the base station may operate additional reference signals for beam measurement. As an example, if the number of beams operated by the base station is 200, the base station may enable the terminal to roughly acquire the beam information (i.e., to perform coarse beam acquisition) by periodically transmitting BRSs capable of expressing parts of 200 beams (e.g., 100 beams), and may enable the terminal to accurately acquire the beam information (i.e., to perform fine beam acquisition) by transmitting additional beam refinement reference signals (BRRSs). That is, the terminal may acquire the best beam information by one-shot using only the BRSs, or may acquire the best beam information in two-step manner of the BRSs and BRRSs.

In the related art, such uplink control information (UCI) may be transmitted on a separate x physical uplink control channel (xPUCCH), or may be transmitted together with data on an x physical uplink shared channel (xPUSCH). Further, the uplink control information may be transmitted on an uplink data channel without the data by a base station command.

In the related art, the terminal determines whether to give feedback of the UCI on xPUCCH or xPUSCH in accordance with the base station command. If uplink grant (UL grant) is received through the DCI in the (n−k)-th DL subframe based on a time when the terminal should report the UCI (e.g., n-th subframe) (k>0), the terminal transmits the UCI on the xPUSCH. Otherwise, if downlink grant (DL grant) is received through the DCI in the (n−k)-th DL subframe, the terminal transmits the UCI on the xPUCCH.

In the related art, the terminal acquires what UCI the terminal should transmit in a specific subframe through the DCI. More specifically, the base station may indicate transmission of the CSI, BSI, or BRI to the terminal using 3-bit field of the DCI, and the terminal may receive the DCI, decode the corresponding field, and acquire information on what UCI the terminal gives feedback of.

000: None of CSI, BSI, and BRI is transmitted.
100: CSI is transmitted.
010: BSI is transmitted.
001: BRI is transmitted.

The remaining bits excluding the above-described bits have been reserved, and thus are not in use. On the other hand, if the field is transmitted to the downlink grant (DL DCI) to trigger the UCI, the corresponding UCI is transmitted on the xPUCCH. If the field is transmitted to the uplink grant (UL DCI) to trigger the UCI, the corresponding UCI is transmitted together with data on the xPUSCH (hereinafter, called "UCI with data"). On the other hand, the base station may guide the UCI to be transmitted on the xPUSCH by configuring a separate 1-bit field of the UL DCI to be transmitted to "1". In this case, the data is not transmitted on the xPUSCH (i.e., only the corresponding UCI is transmitted, and is called "UCI only").

If the DL DCI or UL DCI triggers UCI transmission on the xPUCCH or xPUSCH, or if the separate 1-bit field of the UL DCI is configured to "1" to command the UCI transmission on the xPUSCH, the DCI can notify of time-axis resources for UCI transmission (what subframe (or what symbol) the UCI is to be transmitted in after reception of the DCI) and frequency-axis resources (what resource block the UCI is to be transmitted in).

As for the time-axis resource, if the field is included in the DCI received in the n-th subframe, the corresponding UCI can be transmitted in the (n+K)-th subframe. In this case, if the field is included in the DL DCI, the corresponding UCI is transmitted on the xPUCCH of the (n+K)-th subframe, whereas if the field is included in the UL DCI, the corresponding UCI is transmitted on the xPUSCH of the (n+K)-th subframe. Here, K may be one of values expressed by integers, such as 0, 1, . . . , and 7. For example, if K=7, the UCI is transmitted in the (n+7)-th subframe.

Further, different DCIs transmitted in different subframes can command different UCI transmissions. For example, the field of the UL DCI transmitted to a downlink in the n-th subframe may be configured to "100", and may command the terminal to transmit the CSI in the (n+7)-th subframe (in case of K=7). Further, the field of the UL DCI transmitted to a downlink in the (n+1)-th subframe may be configured to "010", and may command to transmit the BSI in the (n+7)-th subframe. Further, the field of the UL DCI transmitted to a downlink in the (n+1)-th subframe may be configured to "001", and may command to transmit the BRI in the (n+7)-th subframe.

In such a situation, if different DCIs transmitted in different subframes command a specific terminal to transmit the UCI on the same frequency resource or different frequency resources of the same subframe, the following problems may occur.

Figure 2A:
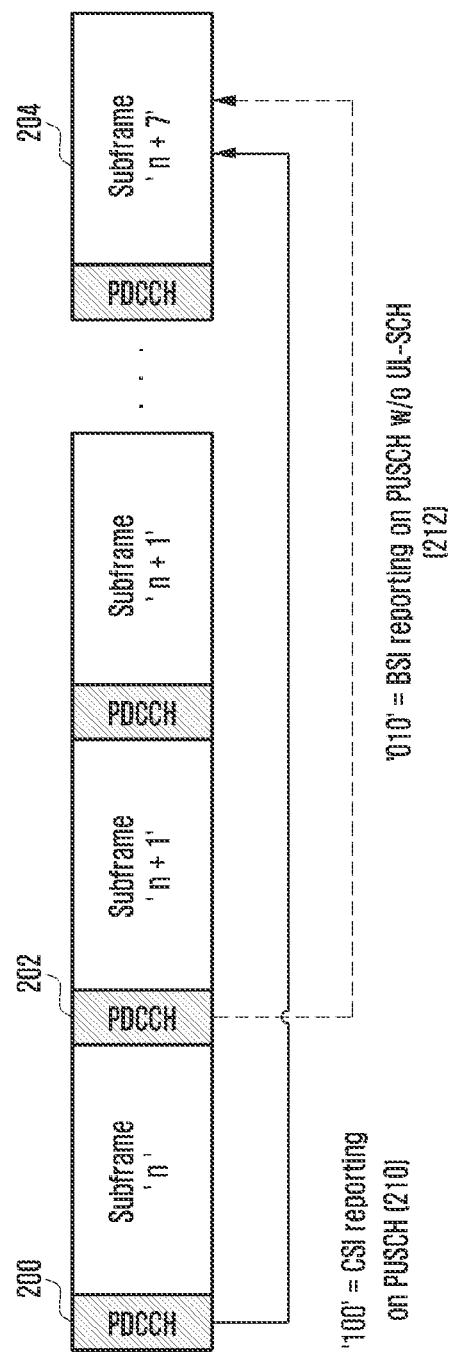
FIGS. 2A, 2B, and 2C are diagrams explaining problems that may occur during a UCI transmission command.
Figure 2B:
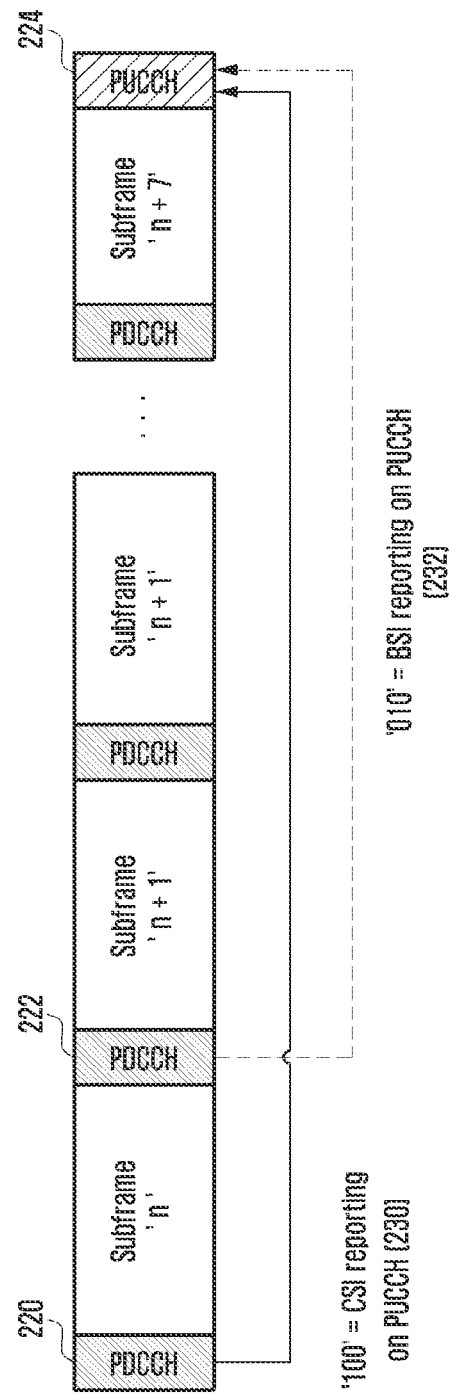
Figure 2C:
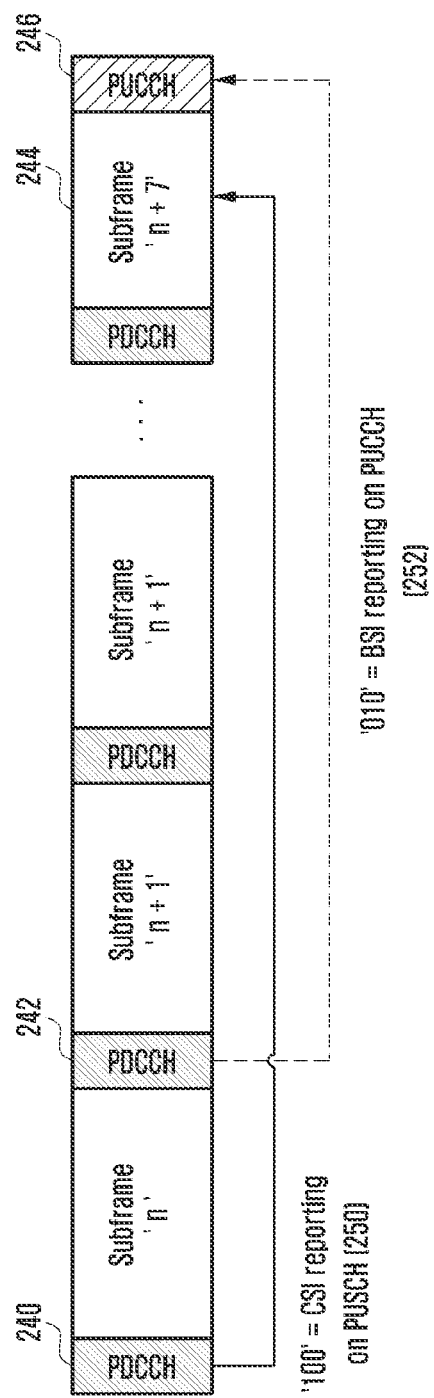

FIGS. 2A, 2B, and 2C are diagrams explaining problems that may occur during a UCI transmission command.

First, there is a collision problem between the same physical channels (PHY channels). FIG. 2A illustrates a PUSCH collision problem in the first case.

The base station can command the terminal to transmit the CSI in the (n+7)-th subframe by configuring the field of the UL DCI 220 transmitted to a downlink in the n-th subframe to "100" (210). This corresponds to a case of K=7. In this case, the UCI is multiplexed with the data and is transmitted on the xPUSCH 204. Further, the base station can command the terminal to transmit the BSI in the (n+7)-th subframe by configuring the field of the UL DCI 202 transmitted to the downlink in the (n+1)-th subframe to "010" (212). In this case, the UCI is not multiplexed with the data, but is transmitted on the xPUSCH 204. Further, the base station can command the terminal to transmit only the data without the UCI in the (n+7)-th subframe by configuring the field of the UL DCI transmitted to the downlink in the (n+2)-th subframe to "000". The above-described example exemplifies that different DCIs request operations of different terminals on the same channel (xPUSCH) 204.

As another example, collision between the PUCCHs may also occur. FIG. 2B illustrates a PUCCH collision problem in the first case. The base station can command the terminal to transmit the CSI in the (n+7)-th subframe by configuring the field of the DL DCI 220 transmitted to the downlink in the n-th subframe to "100" (230). This corresponds to a case of K=7. In this case, since the UCI is triggered by the DL DCI, it is transmitted on the xPUCCH 246. Further, the base station can command the terminal to transmit the BSI in the (n+7)-th subframe by configuring the field of the UL DCI 222 transmitted to the downlink in the (n+1)-th subframe to "010" (232). In this case, the UCI is triggered by the DL DCI, and thus is transmitted on the xPUCCH.

If the different DCIs transmitted at different times request operations of the different terminals as described above, it is necessary to examine closely what operation the terminal should perform.

Second, there is a collision problem between different physical channels and physical signals (PHY signals). FIG. 2C illustrates a collision problem in the second case. The base station can command the terminal to transmit the CSI in the (n+7)-th subframe by configuring the field of the UL DCI 240 transmitted to the downlink in the n-th subframe to "100" (250). This corresponds to a case of K=7. In this case, the UCI is multiplexed with the data and is transmitted on the xPUSCH 244. Further, the base station can command the terminal to transmit the BSI in the (n+7)-th subframe by configuring the field of the DL DCI 242 transmitted to the downlink in the (n+1)-th subframe to "010" (252). In this case, the UCI is transmitted on the xPUCCH 246.

In the n-th subframe, the base station may notify of the UCI to be transmitted to the (n+7)-th subframe and the number of symbols to be used for data transmission through the UL DCI. In this case, the base station should configure the UCI to be transmitted in the (n+7)-th subframe included in the UL DCI transmitted in the n-th subframe and the number of symbols to be used for the data transmission in consideration of the xPUCCH transmitted in the last symbol of the (n+1)-th subframe.

If the base station scheduler does not consider such an item, or if there is an error on the xPDCCH received by the terminal, it is necessary to examine closely what operation the terminal should perform.

The disclosure provides a method and a device for a terminal operation to transmit control information to an uplink in a dynamic frame structure for securing low communication latency that is one of requirements of the 5G communication system and maximizing flexibility of a base station scheduler.

Figure 3A:
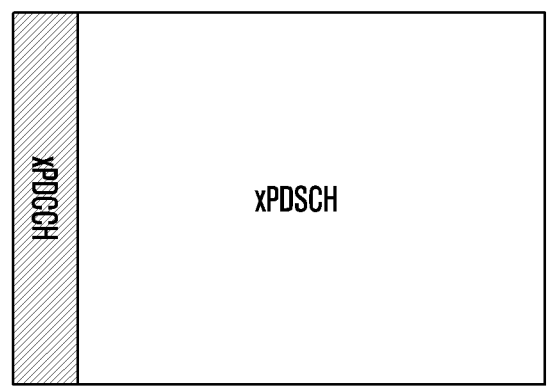
FIGS. 3A, 3B, 3C, and 3D are diagrams illustrating examples of a frame structure for downlink data transmission according to an embodiment of the disclosure.
Figure 3B:
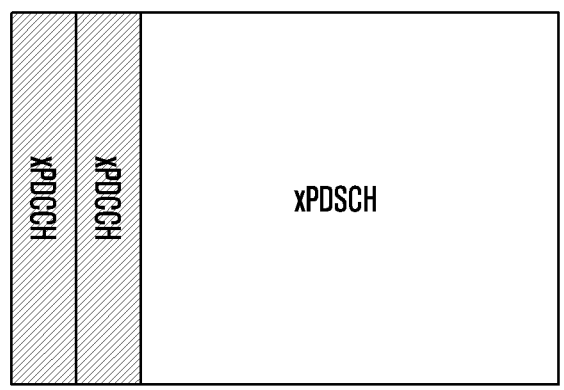

FIGS. 3A, 3B, 3C, and 3D are diagrams illustrating examples of a frame structure for downlink data transmission according to an embodiment of the disclosure. In FIGS. 3A to 3D, one subframe may be composed of N OFDM symbols and M OFDM subcarriers. FIGS. 3A (300) and 3B (310) illustrate examples in which one subframe is composed of an x physical downlink control channel (xPDCCH) for transmitting downlink control information and an x physical downlink shared channel (xPDSCH) for transmitting downlink data information. L symbols in front of a subframe are used for xPDCCH transmission, and the remaining (N-L) OFDM symbols and M OFDM subcarriers are used for xPDSCH transmission. FIG. 3A (300) illustrates an example in case of L=1, and FIG. 3B (310) illustrates an example in case of L=2.

Figure 3C:
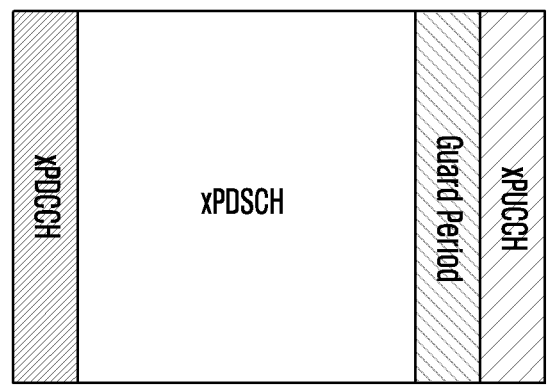
Figure 3D:
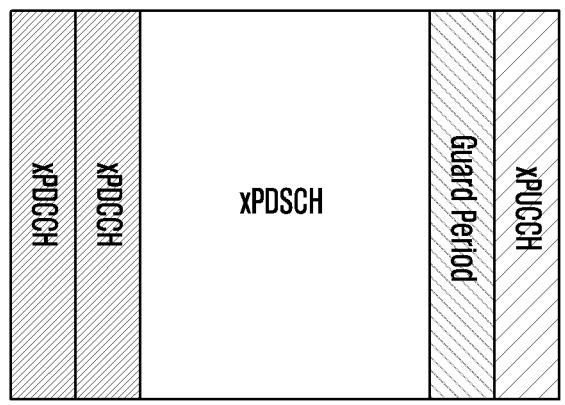

On the other hand, FIGS. 3C (320) and 3D (330) illustrate examples in which one subframe is composed of an xPDCCH, an xPDSCH, and an xPUCCH for transmitting uplink control information. In this case, between the xPDSCH and the xPUCCH, a guard period is necessary for the purpose of a transmission/reception transition time for the base station to receive the uplink control information from the terminal after performing the downlink data transmission. FIGS. 3C (320) and 3D (330) illustrate examples in which one symbol is used as a guard period. In FIGS. 3C (320) and 3D (330), L symbols in front of a subframe are used for xPDCCH transmission, one symbol is used as a guard period, and one symbol is used for the xPUCCH. The remaining (N−L−2) OFDM symbols and M OFDM subcarriers are used for xPDSCH transmission. FIG. 3C (320) illustrates an example in case of L=1, and FIG. 3D (330) illustrates an example in case of L=2.

Although not illustrated in the drawing, in FIGS. 3C (320) and 3D (330), a sounding reference signal (SRS) for the base station to measure the uplink channel state of the terminal may be transmitted in the xPUCCH symbol position. Further, although not illustrated in the drawing, a channel state information reference signal (CSI-RS) for measuring the downlink channel quality in the last 1 symbol of the subframe (the xPUCCH position in FIGS. 3C (320) and 3D (330)) may be transmitted from the base station to the terminal. Further, the CSI-RS may be transmitted in the last 2 symbols of the subframe (the guard period and the xPUCCH position as in FIGS. 3C (320) and 3D (330)).

Further, although it is exemplified that one symbol is used for the xPUCCH in FIGS. 3C (320) and 3D (330), two symbols may be used for the xPUCCH. In this case, (N−L−3) OFDM symbols and M OFDM subcarriers may be used for the xPDSCH transmission.

In FIGS. 3A to 3D, the base station can broadcast whether the number (L) of symbols used for the xPDCCH transmission is 1 or 2 to all terminals in the cell as system information (i.e., the number of symbols on the xPDCCH can be included in a master information block (MIB) or a system information block (SIB)). As another example, the base station may notify the terminal of the number of xPDCCH symbols through UE-specific RRC signaling. In this case, the terminal may not know the number of xPDCCH symbols when the base station transmits grant to the terminal on the xPDCCH before the base station and the terminal make the RRC connection. To prevent this, the number of xPDCCH symbols may be specified in a random access response (RAR) message, and the number of xPDCCH symbols for RAR grant transmission may always be fixed to "1". As another example, the base station does not transmit any information on the number of xPDCCH symbols to the terminal, and the terminal may perform blind search to identify whether the number of xPDCCH symbols is 1 or 2. As another example, the base station may notify of the number of xPDCCH symbols through the MIB. The terminal can use the number of xPDCCH symbols configured by the MIB until the terminal receives additional information for the number of xPDCCH symbols from the base station.

On the other hand, if the xPUCCH exists in the corresponding subframe as illustrated in FIGS. 3C (320) and 3D (330), and the base station does not notify of this fact, the terminal does not know the number of xPDSCH symbols to be used for the data reception, and thus is unable to perform data decoding. In order to solve this problem, the base station may indicate the number of (xPDSCH) symbols of the corresponding subframe through the DCI on the xPDCCH. As an example, in case of "00", (N−1) symbols can be used on the xPDSCH, and in case of "01", (N−2) symbols can be used on the xPDSCH. In case of "10", (N−3) symbols can be used on the xPDSCH.

FIGS. 4A, 4B, 4C, and 4D are diagrams illustrating examples of a frame structure for uplink data transmission according to an embodiment of the disclosure.

Figure 4A:
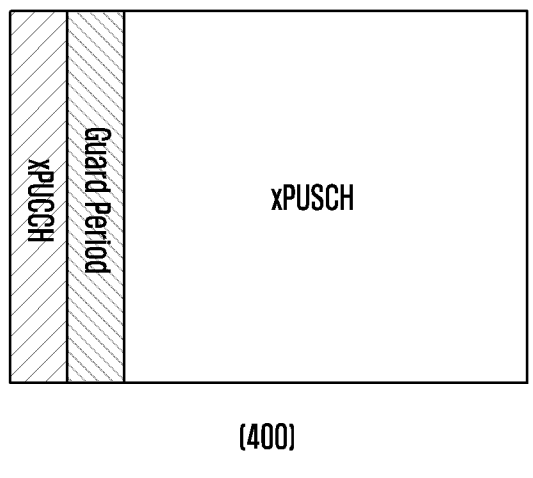
FIGS. 4A, 4B, 4C, and 4D are diagrams illustrating examples of a frame structure for uplink data transmission according to an embodiment of the disclosure.
Figure 4B:
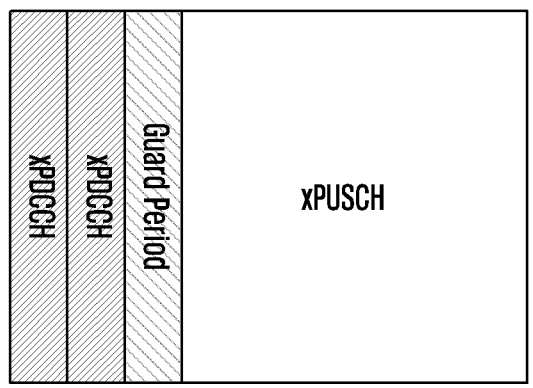

In FIGS. 4A to 4D, one subframe may be composed of N OFDM symbols and M OFDM subcarriers. FIGS. 4A (400) and 4B (410) illustrate examples in which one subframe is composed of an xPDCCH for transmitting downlink control information and an xPUSCH for transmitting uplink data information. L symbols in front of a subframe are used for xPDCCH transmission, and the remaining (N−L) OFDM symbols and M OFDM subcarriers are used for xPUSCH transmission. FIG. 4A (400) illustrates an example in case of L=1, and FIG. 4B (410) illustrates an example in case of L=2. In this case, between the xPDCCH and the xPUSCH, a guard period is necessary for the purpose of s transmission/reception transition time for the base station to receive the uplink data information from the terminal after performing the downlink control information transmission. FIGS. 4A to 4D illustrate examples in which one symbol is used as a guard period.

Figure 4C:
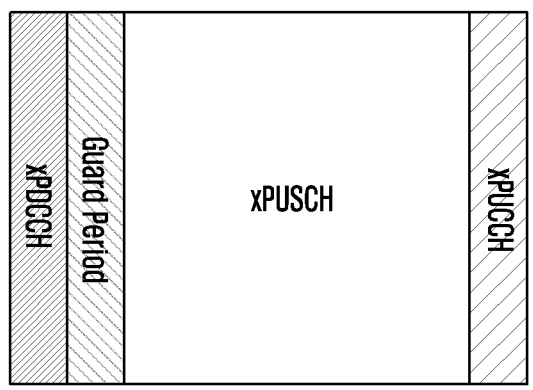
Figure 4D:
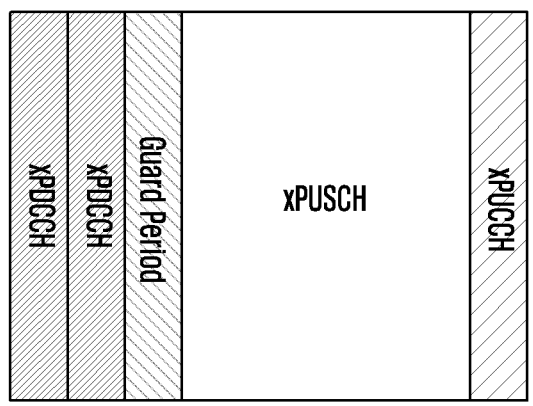

On the other hand, FIGS. 4C (420) and 4D (430) illustrate examples in which one subframe is composed of an xPDCCH, an xPUSCH, and an xPUCCH. In FIGS. 4C (420) and 4D (430), K symbols in front of a subframe are used for xPDCCH transmission, one symbol is used as a guard period, and one symbol is used for the xPUCCH. The remaining (N−L−2) OFDM symbols and M OFDM subcarriers are used for xPUSCH transmission. FIG. 4C (420) illustrates an example in case of L=1, and FIG. 4D (430) illustrates an example in case of L=2.

Although not illustrated in the drawing, in FIGS. 4C (420) and 4D (430), an SRS for the base station to measure the uplink channel state of the terminal may be transmitted in the xPUCCH symbol position. Further, although not illustrated in the drawing, a CSI-RS for measuring the downlink channel quality in the last 1 symbol of the subframe (the xPUCCH position as in FIGS. 4C (420) and 4D (430)) may be transmitted from the base station. Further, the CSI-RS may be transmitted in the last 2 symbols of the subframe.

In the same manner as FIGS. 3A to 3D, in FIGS. 4A to 4D, the base station can broadcast whether the number (L) of symbols used for the xPDCCH transmission is 1 or 2 to all terminals in the cell as system information (i.e., the number of xPDCCH symbols can be included in an MIB or a SIB). As another example, the base station may notify the terminal of the number of xPDCCH symbols through UE-specific RRC signaling. In this case, the terminal may not know the number of xPDCCH symbols when the base station sends grant to the terminal on the xPDCCH before the base station and the terminal make the RRC connection. To prevent this, the number of xPDCCH symbols may be specified in a random access response (RAR) message, and the number of xPDCCH symbols for RAR grant transmission may always be fixed to "1". As another example, the base station does not transmit any information on the number of xPDCCH symbols to the terminal, and the terminal may perform blind search to identify whether the number of xPDCCH symbols is 1 or 2.

On the other hand, if the xPUCCH exists in the corresponding subframe as illustrated in FIGS. 4C (420) and 4D (430), and the base station does not notify of this fact, the terminal does not know the number of xPUSCH symbols to be used for the data transmission, and thus is unable to perform resource mapping. In order to solve this problem, the base station may indicate the number of (xPUSCH) symbols of the corresponding subframe through the DCI on the xPDCCH. As an example, in case of "00", (N−1) symbols can be used on the xPUSCH, and in case of "01", (N−2) symbols can be used on the xPUSCH. In case of "10", (N−3) symbols can be used on the xPUSCH.

Figure 5A:
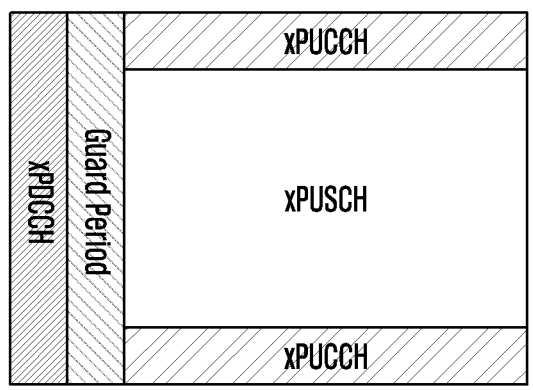
FIGS. 5A, 5B, 5C, and 5D are diagrams illustrating other examples of a frame structure for uplink data transmission according to an embodiment of the disclosure.
Figure 5B:
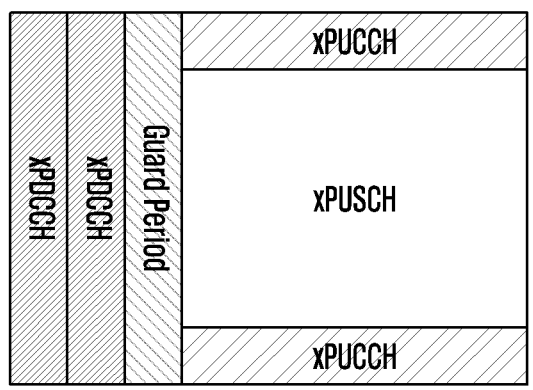
Figure 5C:
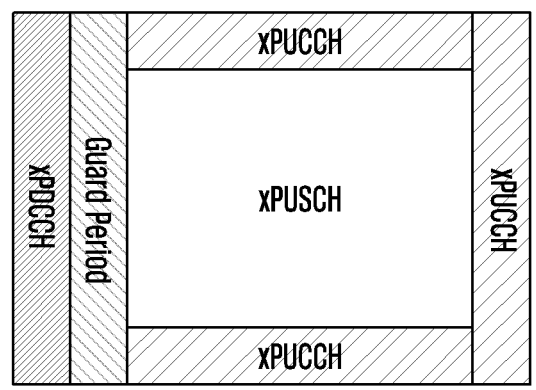
Figure 5D:
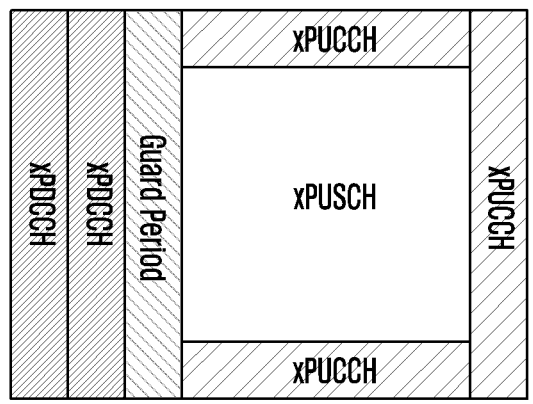

FIGS. 5A, 5B, 5C, and 5D are diagrams illustrating other examples of a frame structure for uplink data transmission according to an embodiment of the disclosure. In FIGS. 4A to 4D, the xPUCCH and the xPUSCH are time-divided, whereas FIGS. 5A to 5D exemplify a case where the xPUCCH and the xPUSCH are frequency-divided. In particular, as illustrated in FIGS. 5C (520) and 5D (530), an xPUCCH (called long PUCCH) capable of being frequency-divided with an xPUSCH and an xPUCCH (called short PUCCH) capable of being time-divided and used with an xPUSCH may coexist in the same subframe. In FIGS. 5C (520) and 5D (530), the short PUCCH and the long PUCCH may be used by one terminal or may be used by different terminals. In case where one terminal uses the short PUCCH and the long PUCCH, UCI having a large payload can be transmitted through the long PUCCH, and UCI having a small payload can be transmitted through the short PUCCH. Further, since the long PUCCH has a large number of symbols, more energy can be used as compared with the short PUCCH having a small number of symbols (e.g., it may be composed of one symbol or two symbols), and thus the long PUCCH can be used in case where xPUCCH transmission supporting wider coverage is necessary.

In the related art, one DCI triggers only one kind of UCI, and in case where one DCI triggers one kind of UCI, the terminal operation may become vague. As one method to solve this, a case where one DCI triggers two or more UCIs may be considered. More specifically, specific fields of DL/UL DCI for triggering UCI in the disclosure may be as follows.

000: None of CSI, BSI, and BRI is transmitted.
100: CSI is transmitted.
010: BSI is transmitted.
001: BRI is transmitted.
110: CSI and BSI are multiplexed with each other to be transmitted, and for a payload, CSI is first configured, and then BSI is configured. The payload composed of the CSI and the BSI is joint-encoded.

101: CSI and BRI are multiplexed with each other to be transmitted, and for a payload, CSI is first configured, and then BRI is configured. The payload composed of the CSI and the BRI is joint-encoded.

011: BSI and BRI are multiplexed with each other to be transmitted, and for a payload, BSI is first configured, and then BRI is configured. The payload composed of the BSI and the BRI is joint-encoded. If the base station does not perform beam refinement using BRRS, the field "011" is not used (is used for reservation).

111: CSI, BSI, and BRI are multiplexed with each other to be transmitted, and for a payload, CSI is first configured, BSI is then configured, and BRI is last configured. The payload composed of the CSI, the BSI, and the BRI is joint-encoded. If the base station does not perform beam refinement using BRRS, the field "111" is not used (is used for reservation).

In the above-described examples, a case where DL or UL DCI explicitly triggers transmission of the CSI, BSI, and BRI is exemplified, but is not limited thereto. For example, the DL DCI transmitted in the n-th subframe may implicitly trigger HARQ-ACK transmission in the (n+4+L+M)-th subframe, and a specific field of the DL DCI transmitted in the n-th subframe may explicitly trigger the transmission of the CSI, BSI, and BRI.

Hereinafter, xPUCCH transmission/reception means UCI transmission/reception on the xPUCCH, and xPUSCH transmission means transmission/reception of data, data and UCI, or UCI on the xPUSCH. Further, xPDCCH transmission/reception means UL DCI or DL DCI transmission/reception on the xPDCCH, and xPDSCH transmission/reception means data transmission/reception on the xPDSCH.

On the other hand, in order to solve the vague terminal operation that may occur in case where different DCIs trigger operations of different terminals, the terminal may assume the following operations.

Figure 6:
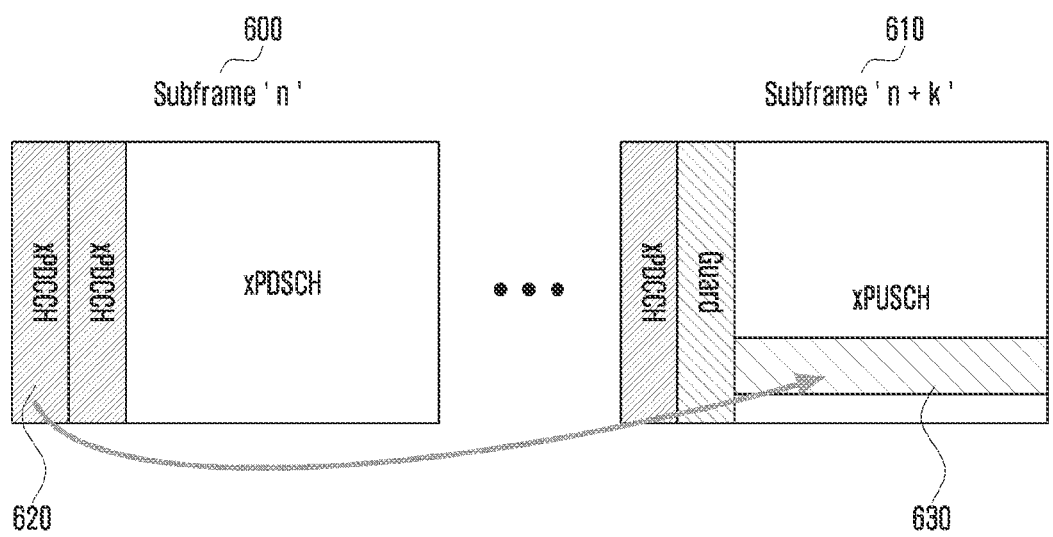
FIG. 6 is a diagram illustrating an example of a timeline of UL DCI reception and uplink data or control information transmission according to an embodiment of the disclosure.

FIG. 6 is a diagram illustrating an example of a timeline of UL DCI reception and uplink data or control information transmission according to an embodiment of the disclosure. Referring to FIGS. 4A to 4D, UL DCI 620 transmitted from the base station in the n-th subframe 600 may indicate that the terminal is to transmit xPUSCH 630 in the (n+K)-th subframe 610. Here, K may be one of values expressed by integers, such as 0, 1, and so on, and is a value indicating a time offset up to the xPUSCH transmission after the DCI reception. For example, if K=7, the UCI is transmitted in the (n+7)-th subframe.

The terminal receives DL DCI or UL DCI for a predetermine time (e.g., X subframes may be configured as a reception window for UCI and/or data), and it is expected that different DCI will not command transmission of different UCI or data at different time points (subframes). If such a situation occurs, the terminal operates in accordance with a rule predefined between the terminal and the base station.

As an example, the terminal may assume that another DCI is not transmitted during X subframes after receiving the initial DCI. More specifically, the terminal having received the DL DCI or UL DCI in the n-th subframe performs a command for UCI transmission or data transmission triggered by the corresponding DCI, and assumes that another DCI is not transmitted during X subframes after the DCI reception in the n-th subframe. If another DCI is transmitted within X subframes after the DCI reception in the n-th subframe, the terminal may disregard this, and may perform an operation commanded by the DCI received in the n-th subframe. In this case, as the X (size of the reception window) value, a value pre-engaged between the base station and the terminal may be used, or the X value may be transmitted from the base station to the terminal through cell-specific RRC signaling or UE-specific RRC signaling.

As another example, different reception windows may be applied in accordance with the DCI triggering operation (i.e., depending on whether the DCI triggers UCI transmission or data transmission). For example, it may be assumed that the reception window for the UCI transmission is X1, and the reception window for the data transmission is X2. Accordingly, if the DCI transmitted in the n-th subframe triggers UCI transmission, the terminal assumes that DCI to trigger another UCI transmission during X1 subframes is not transmitted. Further, if DCI transmitted in the n-th subframe triggers UL data transmission, the terminal assumes that DCI to trigger another UL data transmission during X2 subframes is not transmitted. In this case, X1 and X2 values may be equal to or may be different from each other, may be pre-engaged between the base station and the terminal, or may be transmitted from the base station to the terminal through cell-specific RRC signaling or UE-specific RRC signaling.

As another example to solve the vague terminal operation that may occur in case where different DCIs trigger operations of different terminals, the terminal may follow a command of the DCI most recently received among DCIs transmitted until the Y-th subframe (i.e., until the (n+4+L+M-Y)-th subframe) based on the time when the UCI report or data transmission should be performed (e.g., the (n+4+L+M)-th subframe). In this case, Y may be a value pre-engaged between the base station and the terminal, or may be transmitted to the terminal through cell-specific RRC signaling or UE-specific RRC signaling. Such a terminal operation may be used in association with the above-described reception windows X, X1, to X2. For example, the terminal may receive the DCI during the reception windows (X, X1, to X2 subframes), and may follow the command of the DCI most recently received in the reception window.

As another example to solve the vague terminal operation that may occur in case where different DCIs trigger operations of different terminals, the terminal may abandon transmission of partial information (control information or data information) by a predefined rule, and the following rules can be applied.

First case is a case where different DCIs trigger transmission of different xPUCCHs of the same subframe.

For example, DL DCI or UL DCI in the n-th subframe can trigger the UCI transmission (e.g., CSI report) on the xPUCCH of the (n+K)-th subframe, and DL DCI or UL DCI in the (n+1)-th subframe can trigger another UCI transmission (e.g., HARQ-ACK transmission) on the xPUCCH of the same (n+K)-th subframe. In this case, the following terminal operations can be defined.

The first case is a case where different DCIs indicate time and frequency resources on the same xPUCCH of the same subframe, and in this case, different UCIs can be multiplexed with each other and can be transmitted on the xPUCCH. For example, if DL DCI or UL DCI in the n-th subframe triggers the terminal to transmit UCI-1 in time and frequency resource-1 on the xPUCCH in the (n+K)-th subframe (e.g., CSI report), and DL DCI or UL DCI in the (n+1)-th subframe triggers to transmit another UCI (UCI-2) in the same time and frequency resource-1 on the xPUCCH of the (n+K)-th subframe (e.g., HARQ-ACK transmission), the terminal multiplexes UCI-1 and UCI-2 with each other, and transmits the multiplexed UCI-1 and UCI-2 on the xPUCCH through time and frequency resource-1.

In this case, the total number of bits of different multiplexed UCIs should not exceed a predetermined value (e.g., N bits). If the total number of bits of different multiplexed UCIs exceeds the predetermined value, parts of the UCIs may be dropped by a determined rule. Hereinafter, the term "drop" means that partial control information or data is not transmitted. That is, if the total number of bits of the multiplexed UCIs exceeds the predetermined value, the UCI having low priority may not be transmitted to the base station in accordance with the determined rule not included in the bits having a predetermined value.

The second case may be a case where different DCIs indicate time and frequency resources on the different xPUCCH of the same subframe.

As a first method to solve the second case, two or more xPUCCH can be transmitted. For example, if DL DCI or UL DCI in the n-th subframe triggers the terminal to transmit UCI-1 in time and frequency resource-1 on the xPUCCH in the (n+K)-th subframe (e.g., CSI report), and DL DCI or UL DCI in the (n+1)-th subframe triggers to transmit another UCI (UCI-2) in the time and frequency resource-2 on the xPUCCH of the (n+K)-th subframe (e.g., HARQ-ACK transmission), the terminal can transmit UCI-1 on xPUCCH 1, and can transmit UCI-2 on xPUCCH 2. In this case, the xPUCCH 1 and xPUCCH 2 can be time-division-multiplexed (TDM) with each other or frequency-division-multiplexed (FDM) with each other. Whether to transmit two or more xPUCCHs in such different resources can be determined in accordance with terminal capability. Accordingly, terminals that do not have two or more xPUCCH transmission capabilities in different resources may not support the corresponding first method.

A second method to solve the second case is as follows. The first method is unable to support terminals that do not have simultaneous transmission capabilities on different xPUCCHs in different resources, and a case where only one xPUCCH is transmitted according to the rule determined between the base station and the terminal for such terminals can be considered. For example, if DL DCI or UL DCI in the n-th subframe triggers the terminal to transmit UCI-1 in time and frequency resource-1 on the xPUCCH in the (n+K)-th subframe (e.g., CSI report), and DL DCI or UL DCI in the (n+1)-th subframe triggers to transmit another UCI (UCI-2) in the time and frequency resource-2 on the xPUCCH of the (n+K)-th subframe (e.g., HARQ-ACK transmission), the terminal can transmit only one of UCI-1 and UCI-2 in accordance with a predetermined rule with the base station. In this case, the rule between the base station and the terminal can be predefined, or the base station can configure the rule to the terminal through cell-specific or UE-specific RRC signaling.

As an example of the rule predefined between the base station and the terminal, the following priority can be considered. The priority is in the order of HARQ-ACK>SR>beam-related information>CQI. That is, the HARQ-ACK transmission may have the highest priority, and the CQI information may have the lowest priority. Accordingly, the terminal may abandon UCI transmission having low priority in accordance with the engaged priority.

On the other hand, as an example in which the base station configures the priority for UCI transmission to the terminal through cell-specific or UE-specific RRC signaling, the following can be considered. A specific system using hybrid beamforming includes beam-related information as the UCI, but a system that does not use the hybrid beamforming does not include the beam-related information. Accordingly, in the system using the hybrid beamforming, the beam-related information may have a relatively high priority. For example, the priority may be in the order of HARQ-ACK>beam-related information>SR>CQI.

Second case is a case where different DCIs trigger different xPUSCH transmission and xPUCCH transmission of the same subframe.

For example, UL DCI in the n-th subframe can make the terminal trigger one of data transmission, data and UCI transmission, and only UCI transmission on the xPUSCH of the (n+K)-th subframe, and DL DCI or UL DCI in the (n+1)-th subframe can make the terminal trigger specific UCI transmission on the xPUCCH of the (n+K)-th subframe (e.g., HARQ-ACK transmission). In this case, the following terminal operations can be defined.

As a first method, both xPUSCH and xPUCCH can be transmitted. For example, if UL DCI in the n-th subframe triggers transmission of UCI-1 on the xPUSCH in the (n+K)-th subframe of the terminal, and DL DCI or UL DCI in the (n+1)-th subframe triggers transmission of another UCI (UCI-2) on the xPUCCH in the (n+K)-th subframe of the terminal, the terminal can transmit UCI-1 on the xPUSCH, and can transmit UCI-2 on the xPUCCH. In this case, the xPUSCH and the xPUCCH can be time-divided or frequency-divided. Whether to perform successive transmission (in case of time division) or simultaneous transmission (in case of frequency division) of the xPUSCH and the xPUCCH can be determined in accordance with terminal capability. Accordingly, terminals that do not have two or more xPUCCH transmission capabilities in different resources may not support the corresponding first case.

A second method is as follows. The first method may be unable to support terminals that do not have simultaneous transmission capabilities on the xPUSCH and the xPUCCH. Accordingly, a case where only one of xPUSCH and xPUCCH is transmitted by the terminal according to the rule determined between the base station and the terminal for such terminals can be considered. In this case, what channel of xPUSCH and xPUCCH is to be transmitted may follow a rule predefined between the base station and the terminal or information that the base station has configured to the terminal through cell-specific or UE-specific RRC signaling.

As an example of the rule predefined between the base station and the terminal, the following priority may be considered. The first priority is as follows. The xPUCCH always has high priority, and the xPUSCH is not transmitted. The second priority is as follows. The priority may be determined in accordance with the kind of UCI transmitted on the xPUCCH and the xPUSCH. For example, if the UCI is not transmitted on the xPUSCH (i.e., if only data is transmitted on the xPUSCH), the xPUCCH has high priority, and the xPUSCH is not transmitted. If the UCI is transmitted on the xPUSCH (i.e., if data and UCI are multiplexed and transmitted on the xPUSCH, or only UCI is transmitted on the xPUSCH), the priority is in the order of HARQ-ACK>SR>beam-related information>CQI. That is, the HARQ-ACK transmission may have the highest priority, and the CQI information may have the lowest priority. For example, if SR is transmitted on the xPUCCH and HARQ-ACK is multiplexed with data and transmitted on the xPUSCH (or only HARQ-ACK is transmitted on the xPUSCH), the xPUCCH may be dropped (i.e., control information on the xPUCCH is not transmitted to the base station), and only the xPUSCH may be transmitted according to the priority as described above. The rule may be pre-engaged between the base station and the terminal.

On the other hand, as an example in which the base station configures the priority for UCI transmission to the terminal through cell-specific or UE-specific RRC signaling, the following may be considered. A specific system using hybrid beamforming includes beam-related information as the UCI, but a system that does not use the hybrid beamforming does not include the beam-related information. Accordingly, in the system using the hybrid beamforming, the beam-related information may have a relatively high priority. For example, the priority may be in the order of HARQ-ACK>beam-related information>SR>CQI.

Third case is a case where different DCIs trigger different xPUSCH transmission of the same subframe.

For example, UL DCI in the n-th subframe can trigger one of data transmission, data and UCI transmission, and only UCI transmission on the xPUSCH of the (n+K)-th subframe of the terminal, and UL DCI in the (n+1)-th subframe can trigger data transmission, data and UCI transmission, or only UCI transmission on the xPUSCH of the (n+K)-th subframe of the terminal. In this case, the terminal operations as first mentioned above can be similarly applied to the third case. Accordingly, even in the third case, the following terminal operations can be defined.

However, in contrast with the first case, in the third case, it is not necessary to consider a case (first case) in which different DCIs indicate time and frequency resources on the same xPUSCH of the same subframe. The DCI triggers the xPUSCH transmission by configuring the MCS to match the uplink channel characteristics of the terminal, and if the different DCIs trigger different xPUSCH transmission, it may not be preferable that different UCIs or/and data are multiplexed with each other although the same time and frequency resources are indicated. Accordingly, in the third case, such terminal operations are not considered, and only a case where different DCIs trigger different xPUSCH transmissions of the same subframe is considered. In such a situation, the following terminal operations can be defined.

The first method is to transmit two or more xPUSCHs. For example, if UL DCI in the n-th subframe triggers one of data transmission, data and UCI transmission and only UCI transmission on xPUSCH 1 in the (n+K)-th subframe of the terminal, and UL DCI in the (n+1)-th subframe triggers one of data transmission, data and UCI transmission, and only UCI transmission on xPUSCH 2 in the (n+K)-th subframe of the terminal, the terminal can perform different xPUSCH transmissions. In this case, xPUSCH 1 and xPUSCH 2 may be time-divided or frequency-divided. Whether to transmit two or more xPUSCHs may be determined in accordance with the terminal capability. Accordingly, terminals that do not have two or more xPUSCH transmission capabilities may not be able to support the first method.

The second method is as follows. The first method is unable to support terminals that do not have two or more xPUSCH transmission capabilities. Accordingly, for such terminals, a case where only one xPUSCH is transmitted by the rule determined between the base station and the terminal can be considered. For example, if UL DCI in the n-th subframe triggers one of data transmission, data and UCI transmission and only UCI transmission on xPUSCH 1 in the (n+K)-th subframe of the terminal, and UL DCI in the (n+1)-th subframe triggers one of data transmission, data and UCI transmission, and only UCI transmission on xPUSCH 2 in the (n+K)-th subframe of the terminal, the terminal can transmit only one of xPUSCH 1 and xPUSCH 2 according to the determined rule with the base station. In this case, the rule between the base station and the terminal can be predefined, or the base station can configure to the terminal through cell-specific or UE-specific RRC signaling.

As an example of the rule predefined between the base station and the terminal, the following priority may be considered in the order of a case where only UCI is transmitted on xPUSCH>a case where UCI and data are multiplexed and transmitted on xPUSCH>a case where only data is transmitted on xPUSCH. That is, a case where only UCI is transmitted has the highest priority, and a case where only data is transmitted has the lowest priority. This is because HARQ process operation is not performed with respect to the UCI, but the HARQ process operation is performed with respect to the data. That is, even if the data transmission is abandoned, the data can be retransmitted later through the HARQ process.

If xPUSCH 1 and xPUSCH 2 have the same priority (e.g., both xPUSCH 1 and xPUSCH 2 transmit only the UCI), only one xPUSCH can be transmitted according to a predefined rule (priority) in the order of HARQ-ACK>SR>beam-related information>CQI. For example, if the HARQ-ACK is transmitted on xPUSCH 1, and the beam-related information is transmitted on xPUSCH 2, xPUSCH 2 is not transmitted. On the other hand, if xPUSCH 1 and xPUSCH 2 have the same UCI information (e.g., both of them include HARQ-ACK information), the xPUSCH having good channel state (i.e., xPUSCH having high MCS) can be transmitted. This is because there is a high probability that xPUSCH having the good channel state has succeeded in transmission. As another example of the terminal operation in case where xPUSCH 1 and xPUSCH 2 include the same UCI information, the xPUSCH for transmitting the UCI having a large payload has high priority. In case of a large payload, a large amount of information is included therein, and thus efficiency of resource usage can be heightened.

On the other hand, as exemplified in the first case and the second case, the base station can configure the priority to the terminal through cell-specific or UE-specific RRC signaling.

FIGS. 7A, 7B, 7C, and 7D are diagrams illustrating examples in which DCIs transmitted from different subframes indicate xPUCCH resource of the same subframe according to an embodiment of the disclosure.

Figure 7A:
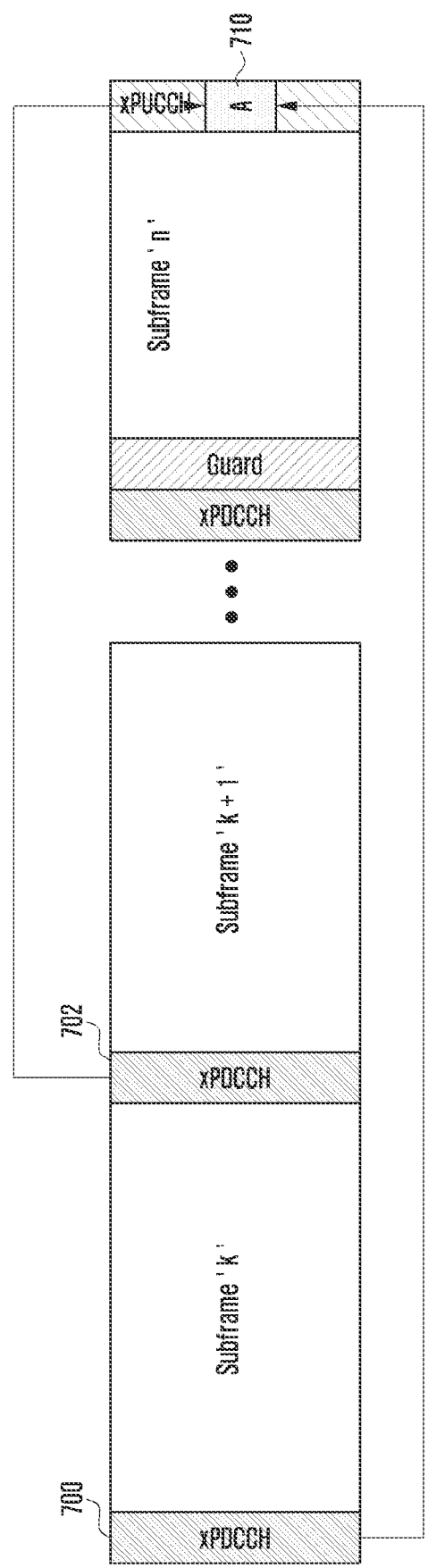
FIGS. 7A, 7B, 7C, and 7D are diagrams illustrating examples in which DCIs transmitted from different subframes indicate xPUCCH resource of the same subframe according to an embodiment of the disclosure.

Specifically, FIG. 7A illustrates an example of a case where DL DCI or UL DCI 700 transmitted from the base station in subframe k commands transmission of UCI-1 in xPUCCH frequency resource A 710 of subframe n of the terminal, and another DL DCI or UL DCI 702 transmitted from the base station in subframe k+1 commands transmission of UCI-2 in xPUCCH frequency resource A 710 of subframe n of the terminal. This case corresponds to the first case of the first case as described above, and the terminal can operate by the above-described method.

Figure 7B:
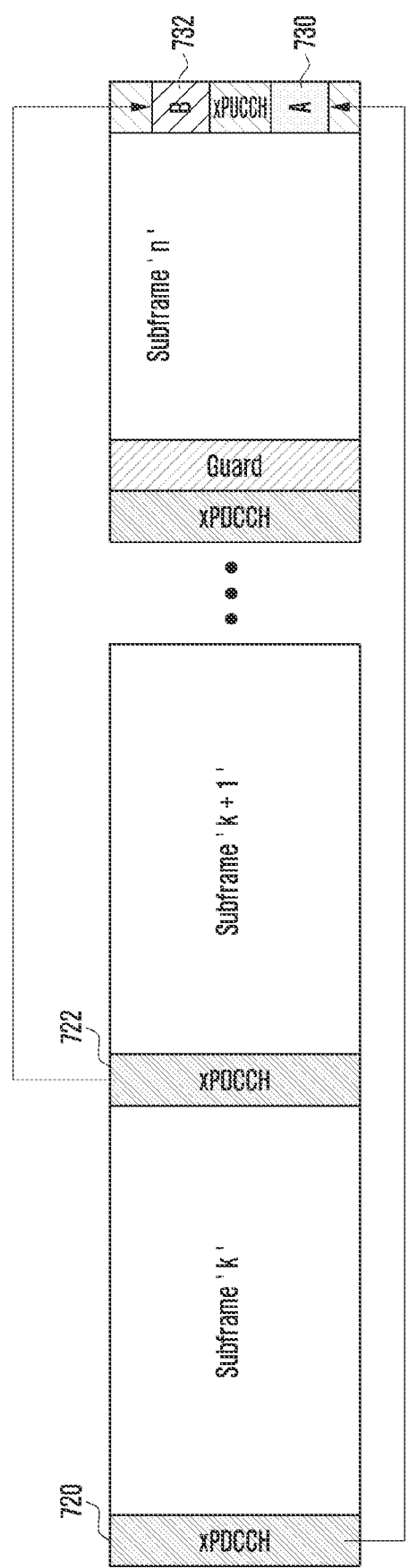
Figure 7C:
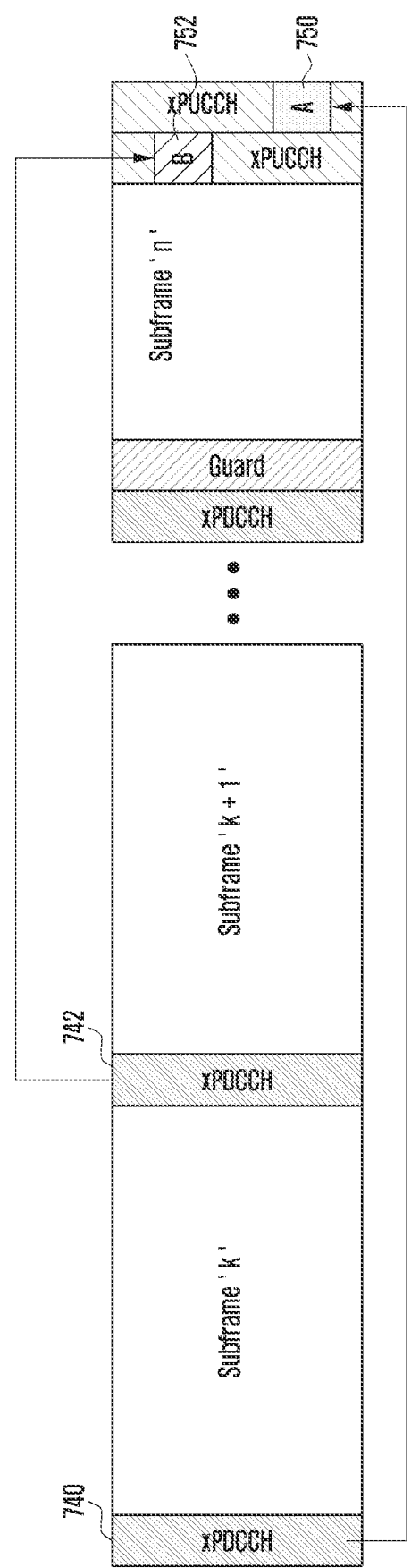

FIG. 7B illustrates an example of a case where DL DCI or UL DCI 720 transmitted from the base station in subframe k commands transmission of UCI-1 in xPUCCH frequency resource A 730 of subframe n of the terminal, and another DL DCI or UL DCI 722 transmitted from the base station in subframe k+1 commands transmission of UCI-2 in xPUCCH frequency resource B 732 of subframe n of the terminal FIG. 7C illustrates an example of a case where DL DCI or UL DCI 740 transmitted from the base station in subframe k commands transmission of UCI-1 in xPUCCH frequency resource A 750 of subframe n of the terminal, and another DL DCI or UL DCI 742 transmitted from the base station in subframe k+1 commands transmission of UCI-2 in xPUCCH frequency resource B 752 of subframe n. In this case, as illustrated in FIG. 7B, frequency resource A 730 and frequency resource B 732 may be located in the same xPUCCH symbol, and as illustrated in FIG. 7C, frequency resource A 750 and frequency resource B 752 may be located in different xPUCCH symbols. FIGS. 7B and 7C correspond to the second case of the first case as mentioned above, and the terminal can operate by the above-mentioned method.

Figure 7D:
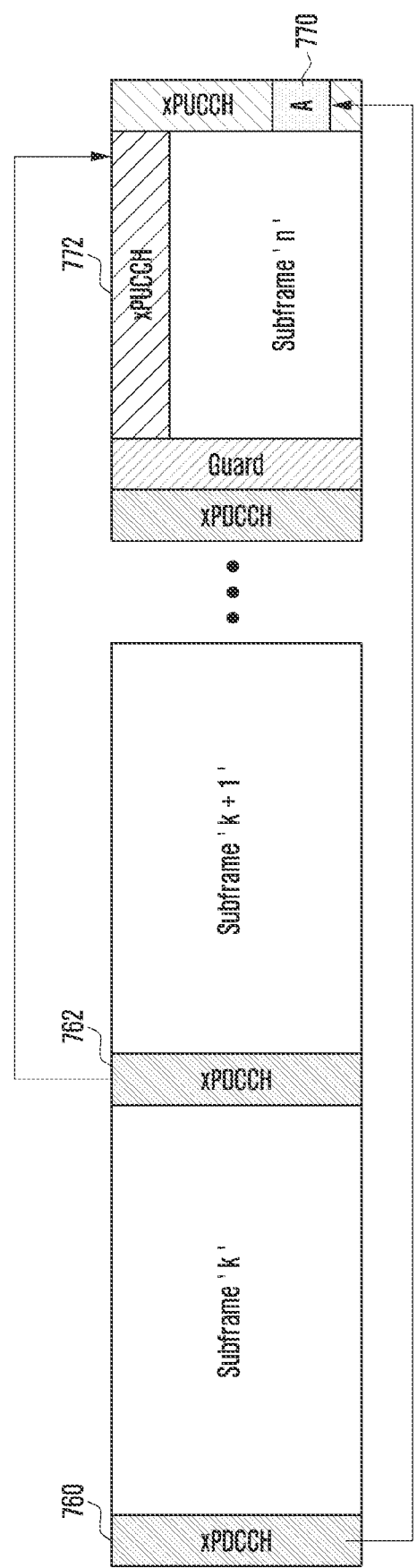

On the other hand, FIG. 7D illustrates an example of a case where DL DCI or UL DCI 760 transmitted from the base station in subframe k commands transmission of UCI-1 in xPUCCH frequency resource A (short xPUCCH) 770 of subframe n of the terminal, and another DL DCI or UL DCI 762 transmitted from the base station in subframe k+1 commands transmission of UCI-2 in xPUCCH frequency resource B (long xPUCCH) 772 of subframe n. This case corresponds to the second case of the first case as mentioned above, and the terminal can operate by the above-described method.

On the other hand, although FIG. 7D illustrates a case where the short xPUCCH and the long xPUCCH are time-divided and transmitted to different symbols, the short xPUCCH and the long xPUCCH may be frequency-divided and transmitted to the same symbol. For example, on the assumption of a subframe composed of 14 symbols, it is assumed that 2 front symbols correspond to xPDCCH, and one symbol corresponds to a guard period (this may be called a gap). In this case, all the remaining 11 symbols can be used for long xPUCCH transmission, and the last one symbol or two symbols among 14 symbols can be used for the short xPUCCH transmission. Accordingly, the last one symbol or two symbols of the long xPUCCH composed of 11 symbols can be frequency-divided with the short xPUCCH to be used.

FIGS. 8A, 8B, 8C, and 8D are diagrams illustrating examples in which DCIs transmitted from different subframes indicate xPUSCH, xPUCCH, SRS, or CSI-RS of the same subframe according to an embodiment of the disclosure.

Figure 8A:
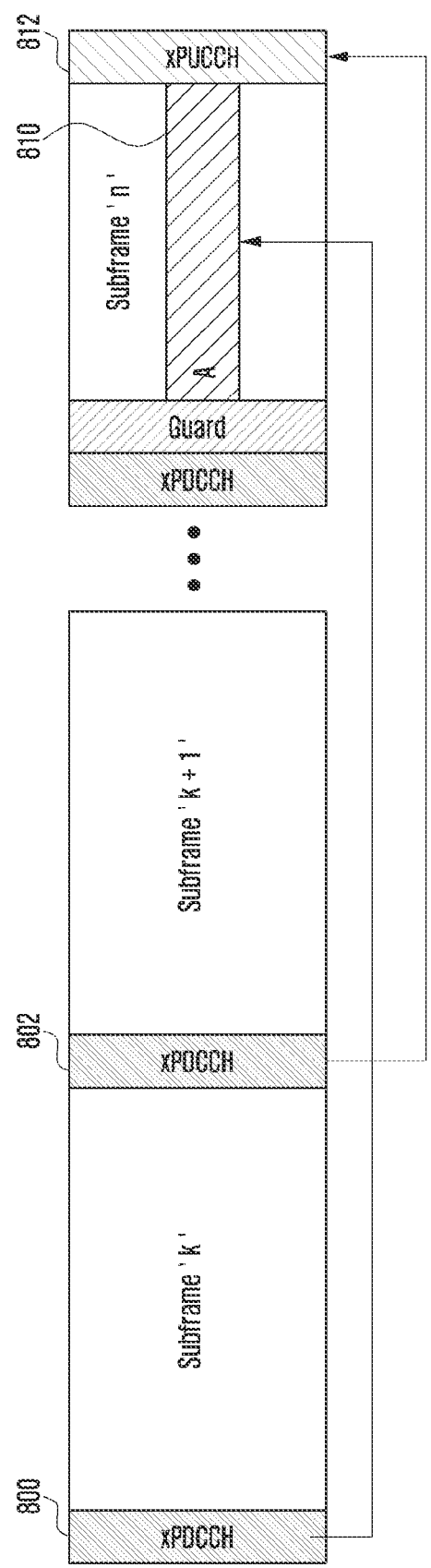
FIGS. 8A, 8B, 8C, and 8D are diagrams illustrating examples in which DCIs transmitted from different subframes indicate xPUSCH, xPUCCH, SRS, or CSI-RS of the same subframe according to an embodiment of the disclosure.

More specifically, FIG. 8A illustrates an example in which UL DCI 800 transmitted from the base station in subframe k commands the terminal to transmit one of data only, UCI only, and UCI with data in xPUSCH frequency resource A 810, and DL DCI 802 transmitted from the base station in subframe k+1 commands transmission of xPUCCH 812 of subframe n. This case corresponds to the second case as described above, and the terminal can operate by the above-mentioned method.

Figure 8B:
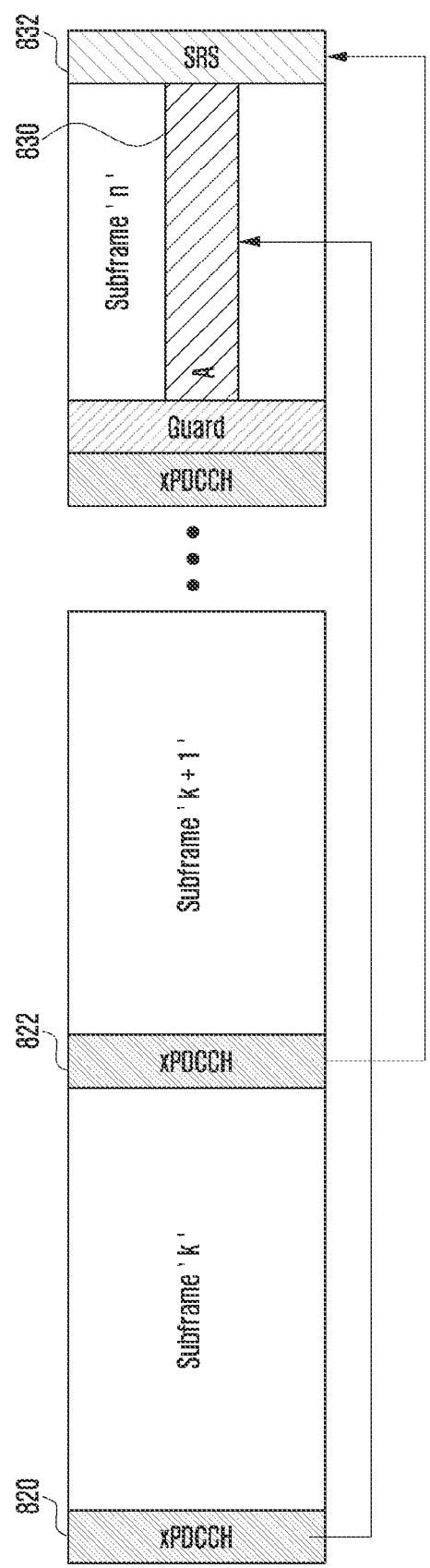

FIG. 8B illustrates an example in which UL DCI 820 transmitted from the base station in subframe k commands the terminal to transmit one of data, UCI, and UCI with data in xPUSCH frequency resource A 830, and DL DCI or UL DCI 822 transmitted from the base station in subframe k+1 commands transmission of an SRS 832 of subframe n. In this case, the terminal may disregard the SRS transmission and transmit xPUSCH, or may disregard the xPUSCH transmission and perform the SRS transmission. Further, the terminal may transmit the SRS by puncturing the xPUSCH symbols used for the SRS transmission, and may transmit the xPUSCH using the remaining non-punctured symbols.

Figure 8C:
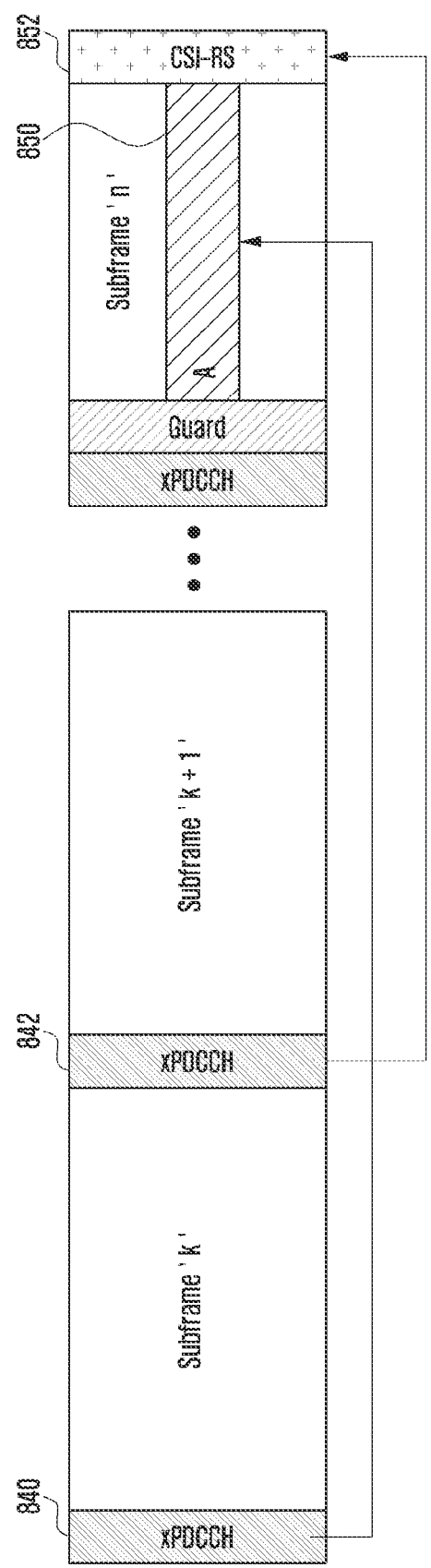
Figure 8D:
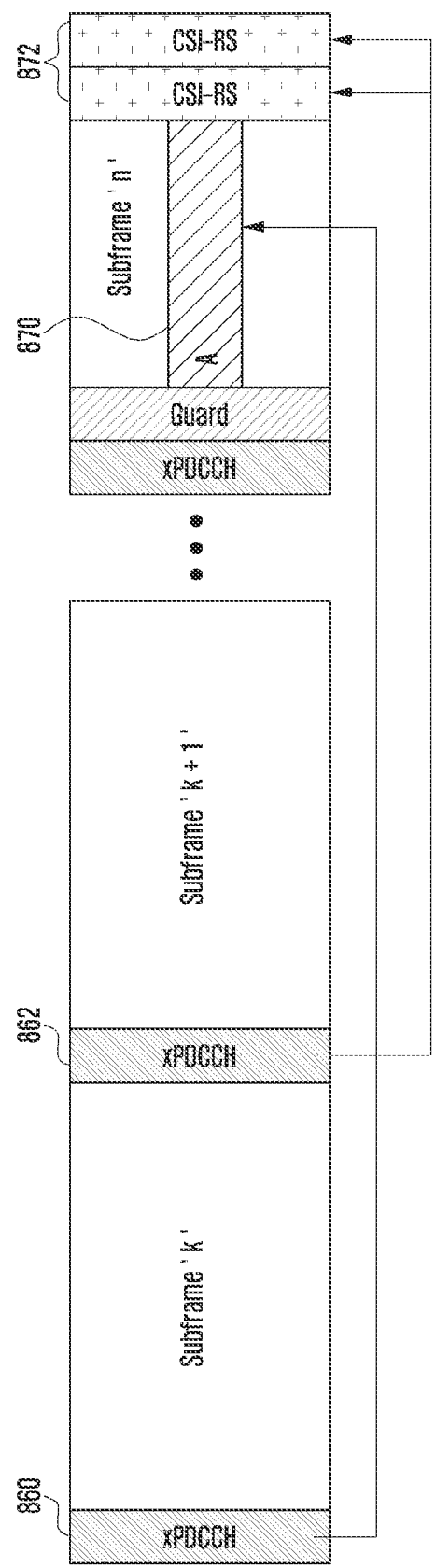

FIG. 8C illustrates an example in which UL DCI 840 transmitted from the base station in subframe k commands the terminal to transmit one of data, UCI, and UCI with data in xPUSCH frequency resource A 850, and DL DCI or UL DCI 842 transmitted from the base station in subframe k+1 commands the terminal to receive CSI-RS 852 of subframe n. FIG. 8D illustrates an example in which UL DCI 860 transmitted from the base station in subframe k commands the terminal to transmit one of data, UCI, and UCI with data in xPUSCH frequency resource A 870, and DL DCI or UL DCI 862 transmitted from the base station in subframe k+1 commands the terminal to receive CSI-RS 872 of subframe n. FIG. 8C exemplifies that the CSI-RS is transmitted from the base station on the last one symbol, and FIG. 8D exemplifies that the CSI-RS is transmitted from the base station on the last two symbols. In this case, the terminal may disregard the CSI-RS reception and transmit xPUSCH, or may disregard the xPUSCH transmission and perform the CSI-RS reception. Further, the terminal may receive the CSI-RS by puncturing the xPUSCH symbol of the last one symbol (in case of FIG. 8C) or the last two symbols (in case of FIG. 8D), and may transmit the xPUSCH using the remaining non-punctured symbols.

Figure 9A:
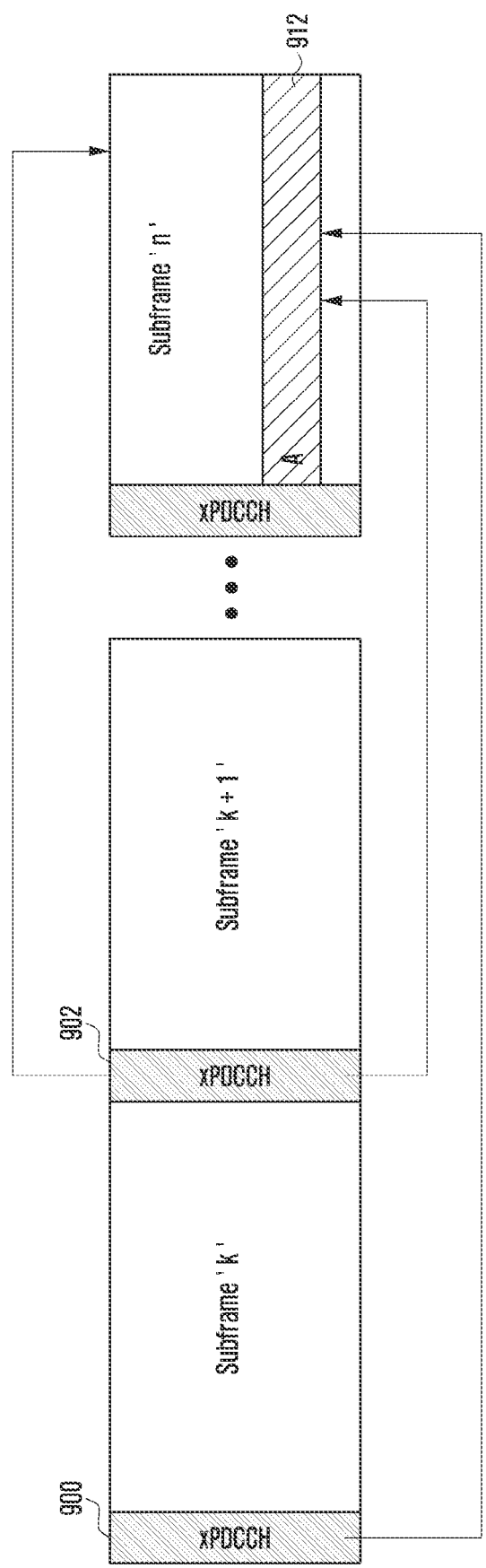
FIGS. 9A and 9B are diagrams illustrating examples in which DCIs transmitted from different subframes indicate different xPUSCHs of the same subframe according to an embodiment of the disclosure.
Figure 9B:
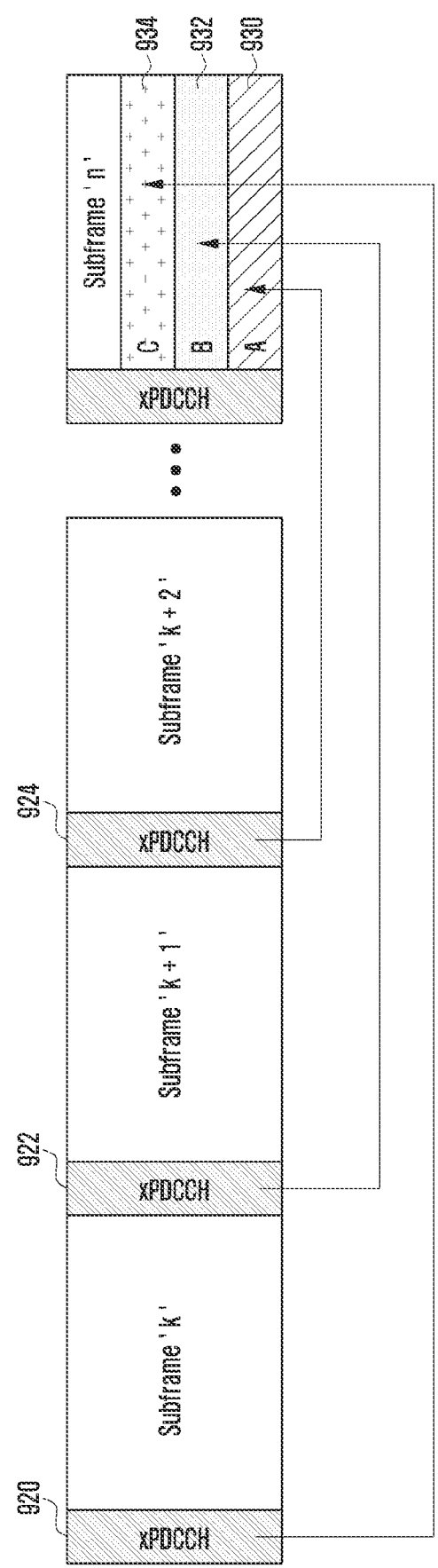

FIGS. 9A and 9B are diagrams illustrating examples in which DCIs transmitted from different subframes indicate different xPUSCHs of the same subframe according to an embodiment of the disclosure.

More specifically, FIG. 9A illustrates an example of a case where UL DCI 900 transmitted from the base station in subframe k commands the terminal to transmit one of data, UCI, and UCI with data in xPUSCH frequency resource A 912, and another UL DCI 902 transmitted from the base station in subframe k+1 commands the terminal to transmit one of data, UCI, and UCI with data in xPUCCH frequency resource A of subframe n. This case corresponds to the first method of the third case as mentioned above, and the terminal can operate by the above-mentioned method.

FIG. 9B illustrates an example of a case where UL DCI 920 transmitted from the base station in subframe k commands the terminal to transmit one of data, UCI, and UCI with data in xPUSCH frequency resource A 930, and another UL DCI 922 transmitted from the base station in subframe k+1 commands the terminal to transmit one of data, UCI, and UCI with data in xPUCCH frequency resource B 932 of subframe n, and still another UL DCI 924 transmitted from the base station in subframe k+2 commands the terminal to transmit one of data, UCI, and UCI with data in xPUCCH frequency resource C 934 of subframe n. This case corresponds to the second method of the third case as mentioned above, and the terminal can operate by the above-mentioned method.

Figure 10:
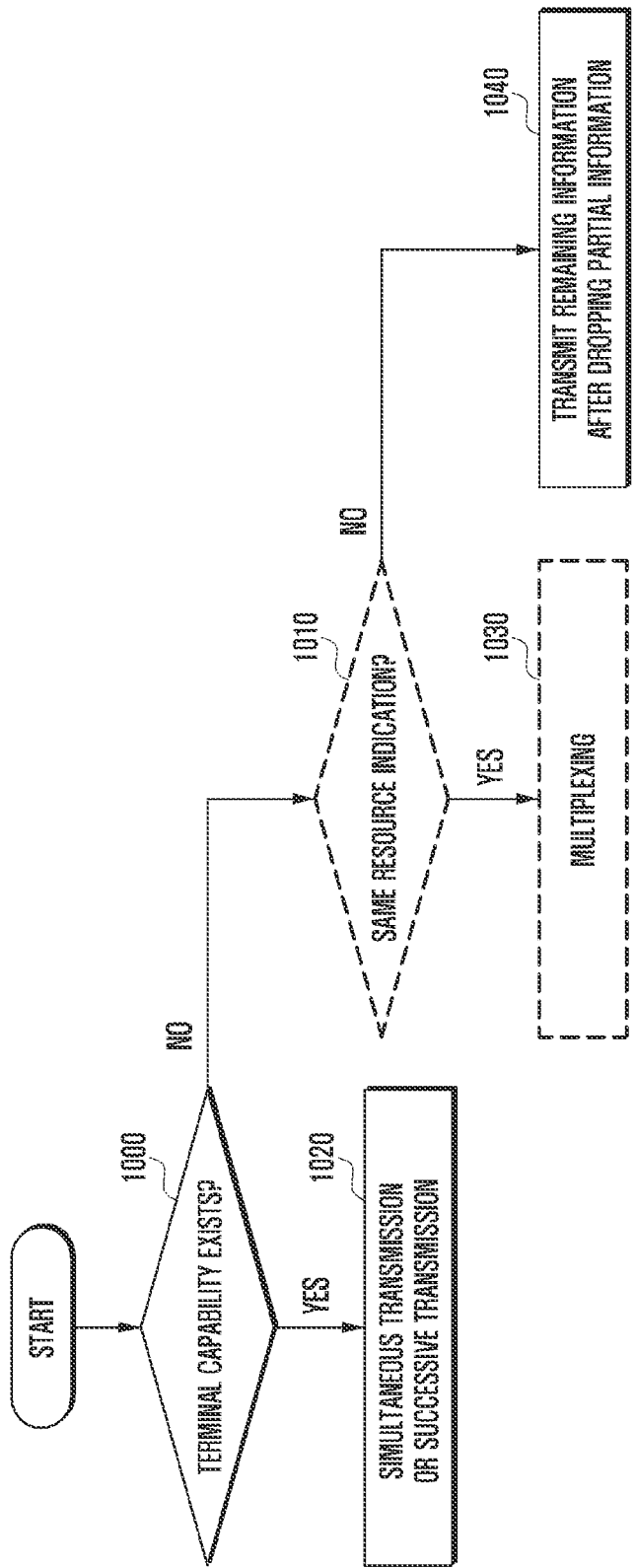
FIG. 10 is a diagram illustrating an operation of a terminal according to an embodiment of the disclosure.

FIG. 10 is a diagram illustrating the operation of a terminal according to an embodiment of the disclosure.

The terminal can report its own capability to a base station during an initial connection to the base station. Further, the terminal and the base station may already be aware of the terminal capability, and in this case, terminal capability report can be omitted. Further, the base station can analogize the terminal capability through another parameter. For example, in case where xPUSCH and xPUCCH are time-divided and transmitted by the terminal, a delay time according to power transition may be required until xPUCCH transmission is performed after completion of xPUSCH transmission due to a difference in transmission power between xPUSCH and xPUCCH. A specific terminal has a very short delay time, and thus can perform the xPUCCH transmission immediately after the xPUSCH transmission. However, another specific terminal has a long delay time, and thus is unable to perform the xPUCCH transmission immediately after the xPUSCH transmission in the same subframe. Accordingly, the terminal may report to the base station whether it can support successive transmission of the xPUSCH and xPUCCH. Such terminal capability is not limited to the successive transmission of the xPUSCH and xPUCCH, but can be applied even to successive transmission of the xPUCCH and xPUCCH as illustrated in FIGS. 7C and 7D and successive transmission of xPUSCH and SRS as illustrated in FIG. 8B.

As another example, in case where xPUSCH and xPUCCH are frequency-divided and transmitted, power back-off should be performed due to an increase of a peak-to-average power ratio (PAPR). A terminal mounted with a power amplifier (PA) having a large dynamic range can support the simultaneous transmission of the xPUSCH and xPUCCH by performing no power back-off or performing a small amount of power back-off. However, a terminal mounted with a PA having a small dynamic range should perform a large amount of power back-off, and thus performance deterioration of the xPUSCH and xPUCCH is expected. Accordingly, such a terminal is unable to perform the simultaneous transmission of the xPUSCH and xPUCCH. Accordingly, the terminal can report to the base station whether the simultaneous transmission of the xPUSCH and xPUCCH is possible. The terminal capability is not limited to the simultaneous transmission of the xPUSCH and xPUCCH, but can be applied even to simultaneous transmission of a long xPUCCH and a short xPUCCH as illustrated in FIG. 7D and simultaneous transmission of the xPUSCHs as illustrated in FIG. 9B.

The terminal determines whether such terminal capability exists (1000). The terminal having the successive transmission or simultaneous transmission capability as described above can perform different commands triggered by different DCIs (1020). However, terminals that cannot support such capability determine whether different DCIs command operations of different terminals in the same subframe (1010). If the corresponding DCIs indicate the same resource, the different UCIs can be multiplexed and transmitted (1030). If the corresponding DCIs indicate different resources, the terminals can transmit remaining information after dropping partial information by the rule determined between the base station and the terminals (1040).

As another example, the terminals that cannot support the successive transmission or simultaneous transmission capability as described above can transmit the remaining information after dropping the partial information by the rule determined between the base station and the terminals regardless of whether the different DCIs indicate the same resource in the same subframe.

Figure 11:
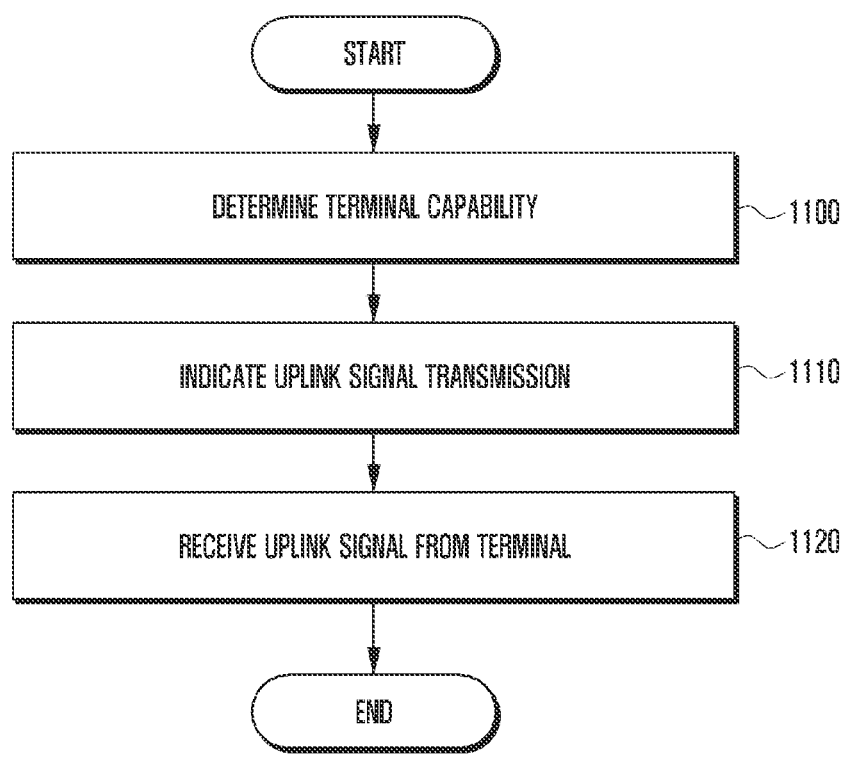
FIG. 11 is a diagram illustrating an operation of a base station according to an embodiment of the disclosure.

FIG. 11 is a diagram illustrating the operation of a base station according to an embodiment of the disclosure.

The base station determines terminal capability based on the capability report of the terminal (1100). Further, the base station may already be aware of the terminal capability, or may analogize the terminal capability through another parameter. Based on the determination as described above, the base station transmits to the terminal UL DCI or DL DCI indicating transmission/reception of at least one of terminal UCI, uplink data, SRS, and CSI-RS on the xPDCCH (1110). The base station receives the UCI, uplink data, and SRS determined according to the contents indicated by the UL DCI or DL DCI and embodiments of the disclosure as described above (1120).

Figure 12:
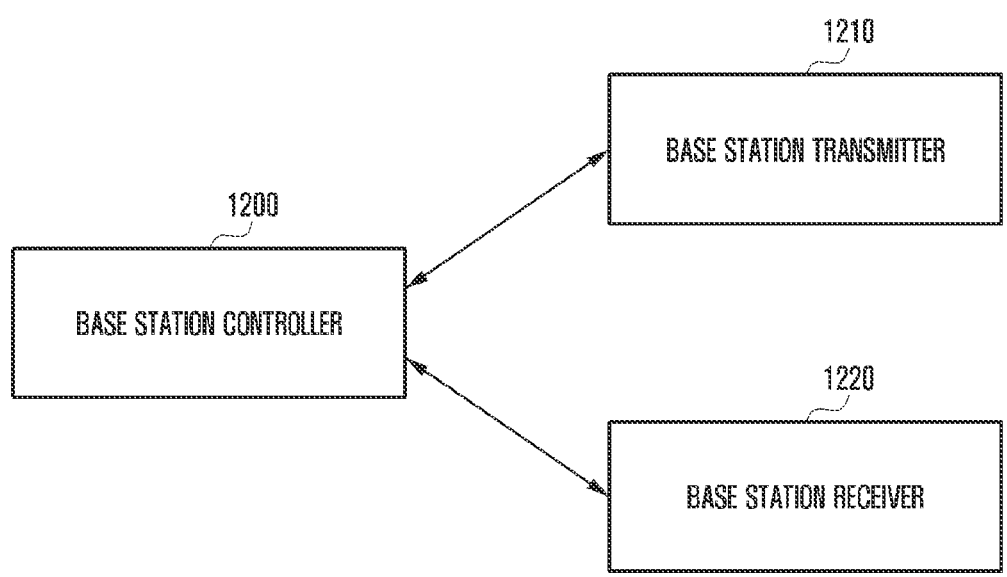
FIGS. 12 and 13 are block diagrams illustrating the structures of a base station and a terminal capable of performing embodiments of the disclosure.
Figure 13:
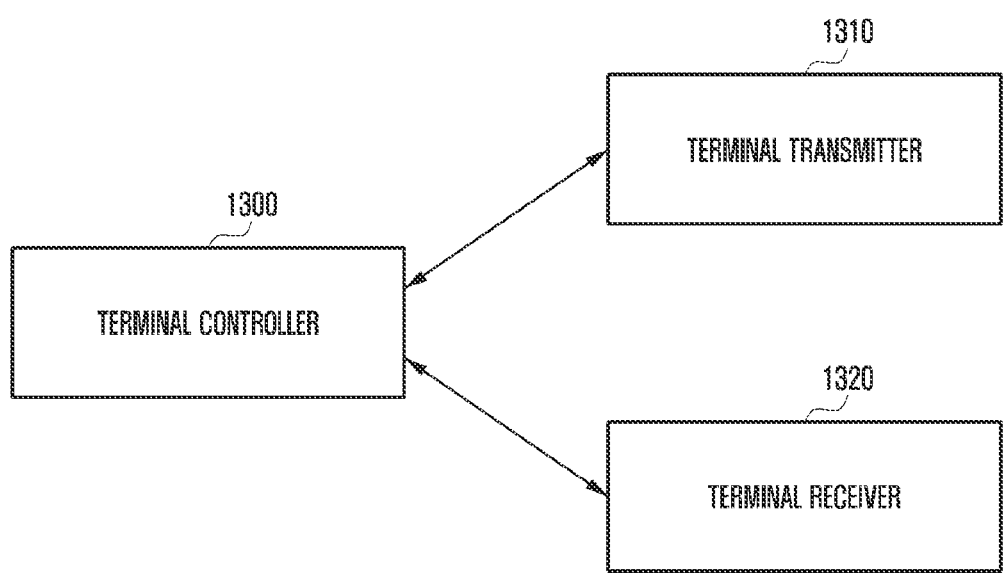

FIGS. 12 and 13 are block diagrams illustrating the structures of a base station and a terminal capable of performing embodiments of the disclosure.

FIG. 12 is a block diagram illustrating the structure of a base station capable of performing this embodiment.

Referring to FIG. 12, a base station according to the disclosure may include at least one of a base station receiver 1220, a base station transmitter 1210, and a base station controller 1200. In an embodiment of the disclosure, the base station receiver 1220 and the base station transmitter 1210 may be commonly called a transceiver. The transceiver may transmit and receive signals with a terminal. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the base station controller 1200, and transmit the signal output from the base station controller 1200 through the radio channel.

The base station controller 1200 may control a series of processes so that the base station can operate according to the above-described embodiments. For example, the base station controller 1200 may control to determine the terminal capability, determine the UCI that the terminal should transmit to the base station and the timing of UCI transmission, and generate UL DCI or DL DCI to be transmitted to the terminal in accordance with the above-described determination. Thereafter, the base station transmitter 1210 may transfer the UL DCI or DL DCI to the terminal, and the base station receiver 1220 may receive the UCI determined in accordance with the UL DCI or DL DCI according to the determined timing.

FIG. 13 is a block diagram illustrating the structure of a terminal capable of performing this embodiment.

Referring to FIG. 13, a terminal according to the disclosure may include a terminal receiver 1320, a terminal transmitter 1310, and a terminal controller 1300. In this embodiment, the terminal receiver 1320 and the terminal transmitter 1310 may be commonly called a transceiver. The transceiver may transmit and receive signals with a base station. The signal may include control information and data. For this, the transceiver may include an RF transmitter up-converting and amplifying a frequency of a transmitted signal, and an RF receiver low-noise-amplifying the received signal and down-converting the frequency of the amplified signal. Further, the transceiver may receive the signal through a radio channel, output the signal to the terminal controller 1300, and transmit the signal output from the terminal controller 1300 through the radio channel.

The terminal controller 1300 may control a series of processes so that the terminal can operate according to the embodiment as described above. For example, the terminal receiver 1320 may receive UL DCI or DL DCI indicating transmission of UCI and the like from the base station, and the terminal controller 1300 may determine the UCI to be transmitted to the base station and the timing of UCI transmission according to the above-described embodiment of the disclosure, and may generate the UCI and the like. Thereafter, the terminal transmitter 1310 may transmit the UCI to the base station in the determined timing.

Further, according to an embodiment of the disclosure, the terminal controller 1300 may determine the terminal capability, and may report the determined terminal capability to the base station using the terminal transmitter 1310.

What is claimed is:

1. A method performed by a terminal in a communication system, the method comprising:
    transmitting, to a base station, terminal capability information associated with a transmission of two physical uplink control channels (PUCCHs) based on a time division multiplexing (TDM) in a same time interval;
    receiving, from the base station, first downlink control information (DCI) including information on a first PUCCH resource;

receiving, from the base station, second DCI including information on a second PUCCH resource; and transmitting, to the base station, a first PUCCH on the first PUCCH resource and a second PUCCH on the second PUCCH resource, wherein the terminal supports the transmission of two PUCCHs based on the TDM in the same time interval and the first PUCCH resource and the second PUCCH resource are indicated to be in another time resource.

2. The method of claim 1,
wherein the two PUCCHs corresponds to two short PUCCHs or one long PUCHH and one short PUCCH,
wherein a short PUCCH is transmitted over 1 symbol or 2 symbols, and
wherein a long PUCCH is transmitted over 4 or more symbols.

3. The method of claim 1,
wherein the first DCI includes information on a first hybrid automatic repeat request-acknowledgement (HARQ-ACK) transmission timing,
wherein the second DCI includes information on a second HARQ-ACK transmission timing, and
wherein the second PUCCH resource is determined as a PUCCH resource for a HARQ in case that the first HARQ-ACK transmission timing and the second HARQ-ACK transmission timing indicate a same transmission timing.

4. The method of claim 3, wherein the second DCI is received later than the first DCI and the second DCI is received earlier than a specific time interval from a beginning of the first PUCCH resource.

5. The method of claim 3, wherein first HARQ-ACK information and second HARQ-ACK information are multiplexed on the PUCCH resource.

6. A method performed by a base station in a communication system, the method comprising:
receiving, from a terminal, terminal capability information associated with a transmission of two physical uplink control channels (PUCCHs) based on a time division multiplexing (TDM) in a same time interval;
transmitting, to the terminal, first downlink control information (DCI) including information on a first PUCCH resource;
transmitting, to the terminal, second DCI including information on a second PUCCH resource; and
receiving, from the terminal, a first PUCCH on the first PUCCH resource and a second PUCCH on the second PUCCH resource, wherein the terminal supports the transmission of two PUCCHs based on the TDM in the same time interval and the first PUCCH resource and the second PUCCH resource are indicated to be in another time resource.

7. The method of claim 6,
wherein the two PUCCHs corresponds to two short PUCCHs or one long PUCHH and one short PUCCH,
wherein a short PUCCH is transmitted over 1 symbol or 2 symbols, and
wherein a long PUCCH is transmitted over 4 or more symbols.

8. The method of claim 6,
wherein the first DCI includes information on a first hybrid automatic repeat request-acknowledgement (HARQ-ACK) transmission timing,
wherein the second DCI includes information on a second HARQ-ACK transmission timing, and
wherein the second PUCCH resource is determined as a PUCCH resource for a HARQ in case that the first HARQ-ACK transmission timing and the second HARQ-ACK transmission timing indicate a same transmission timing.

9. The method of claim 8, wherein the second DCI is transmitted later than the first DCI and the second DCI is transmitted earlier than a specific time interval from a beginning of the first PUCCH resource.

10. The method of claim 8, wherein first HARQ-ACK information and second HARQ-ACK information are multiplexed on the PUCCH resource.

11. A terminal in a communication system, the terminal comprising:
a transceiver; and
a controller configured to:
transmit, to a base station, terminal capability information associated with a transmission of two physical uplink control channels (PUCCHs) based on a time division multiplexing (TDM) in a same time interval,
receive, from the base station, first downlink control information (DCI) including information on a first PUCCH resource,
receive, from the base station, second DCI including information on a second PUCCH resource, and
transmit, to the base station, a first PUCCH on the first PUCCH resource and a second PUCCH on the second PUCCH resource, wherein the terminal supports the transmission of two PUCCHs based on the TDM in the same time interval and the first PUCCH resource and the second PUCCH resource are indicated to be in another time resource.

12. The terminal of claim 11,
wherein the two PUCCHs corresponds to two short PUCCHs or one long PUCHH and one short PUCCH,
wherein a short PUCCH is transmitted over 1 symbol or 2 symbols, and
wherein a long PUCCH is transmitted over 4 or more symbols.

13. The terminal of claim 11,
wherein the first DCI includes information on a first hybrid automatic repeat request-acknowledgement (HARQ-ACK) transmission timing,
wherein the second DCI includes information on a second HARQ-ACK transmission timing, and
wherein the second PUCCH resource is determined as a PUCCH resource for a HARQ in case that the first HARQ-ACK transmission timing and the second HARQ-ACK transmission timing indicate a same transmission timing.

14. The terminal of claim 13, wherein the second DCI is received later than the first DCI and the second DCI is received earlier than a specific time interval from a beginning of the first PUCCH resource.

15. The terminal of claim 13, wherein first HARQ-ACK information and second HARQ-ACK information are multiplexed on the PUCCH resource.

16. A base station in a communication system, the base station comprising:
a transceiver; and
a controller configured to:
receive, from a terminal, terminal capability information associated with a transmission of two physical uplink control channels (PUCCHs) based on a time division multiplexing (TDM) in a same time interval, transmit, to the terminal, first downlink control information (DCI) including information on a first PUCCH resource, transmit, to the terminal, second DCI including information on a second PUCCH resource, and receive, from the terminal, a first PUCCH on the first PUCCH resource and a second PUCCH on the second PUCCH resource, wherein the terminal supports the transmission of two PUCCHs based on the TDM in the same time interval and the first PUCCH resource and the second PUCCH resource are indicated to be in another time resource.

17. The base station of claim 16, wherein the two PUCCHs corresponds to two short PUCCHs or one long PUCHH and one short PUCCH, wherein a short PUCCH is transmitted over 1 symbol or 2 symbols, and wherein a long PUCCH is transmitted over 4 or more symbols.

18. The base station of claim 16, wherein the first DCI includes information on a first hybrid automatic repeat request-acknowledgement (HARQ-ACK) transmission timing, wherein the second DCI includes information on a second HARQ-ACK transmission timing, and wherein the second PUCCH resource is determined as a PUCCH resource for a HARQ in case that the first HARQ-ACK transmission timing and the second HARQ-ACK transmission timing indicate a same transmission timing.

19. The base station of claim 18, wherein the second DCI is transmitted later than the first DCI and the second DCI is transmitted earlier than a specific time interval from a beginning of the first PUCCH resource.

20. The base station of claim 18, wherein first HARQ-ACK information and second HARQ-ACK information are multiplexed on the PUCCH resource.

* * * * *